United States Patent
Nie

(10) Patent No.: US 11,941,851 B2
(45) Date of Patent: *Mar. 26, 2024

(54) SYSTEMS AND METHODS FOR CALIBRATING IMAGING AND SPATIAL ORIENTATION SENSORS

(71) Applicant: Xiaochun Nie, Mountain View, CA (US)

(72) Inventor: Xiaochun Nie, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,894

(22) Filed: Sep. 21, 2021

(65) Prior Publication Data

US 2022/0005225 A1   Jan. 6, 2022

Related U.S. Application Data

(63) Continuation of application No. 16/638,615, filed as application No. PCT/US2018/049469 on Sep. 5, 2018, now Pat. No. 11,170,531.

(60) Provisional application No. 62/557,786, filed on Sep. 13, 2017.

(51) Int. Cl.
*G06T 7/80* (2017.01)

(52) U.S. Cl.
CPC ...... *G06T 7/80* (2017.01); *G06T 2207/30244* (2013.01)

(58) Field of Classification Search
CPC ... G06T 7/80; G06T 2207/30244; G06T 7/73; G01C 25/00
See application file for complete search history.

(56) References Cited

U.S. PATENT DOCUMENTS

| 2016/0360997 | A1  | 12/2016 | Yadav et al. |
| 2017/0018086 | A1* | 1/2017  | Zhang ........................ G06T 7/73 |
| 2017/0032537 | A1* | 2/2017  | Li ........................ H04N 17/002 |
| 2017/0148155 | A1* | 5/2017  | Wei ........................... G06T 7/33 |
| 2017/0301111 | A1* | 10/2017 | Zhao ...................... H04N 23/90 |
| 2019/0132516 | A1* | 5/2019  | Li ...................... H04N 23/6812 |

FOREIGN PATENT DOCUMENTS

| CN | 104766292 | A | 7/2015 |
| CN | 106030431 | A | 10/2016 |
| CN | 106814963 | A | 6/2017 |
| CN | 106872990 | A | 6/2017 |
| CN | 106990836 | A | 7/2017 |

\* cited by examiner

*Primary Examiner* — Syed Haider
(74) *Attorney, Agent, or Firm* — IPro, PLLC

(57) ABSTRACT

Disclosed herein are various methods of calibrating relative orientation between spatial orientation sensors, relative orientation between imaging sensor and spatial orientation sensor, and relative orientation between imaging sensors. The relative orientation of the spatial orientation sensors, imaging sensors is calculated with respect to a reference frame.

11 Claims, 17 Drawing Sheets

SYSTEMS AND METHODS FOR CALIBRATING IMAGING AND SPATIAL ORIENTATION SENSORS

CROSS-REFERENCE TO RELATED APPLICATIONS

The disclosure of U.S. Provisional Application No. 62/557,786 is hereby incorporated by reference in its entirety.

TECHNICAL FIELD

This disclosure relates to calibrating relative orientation between spatial orientation sensors, relative orientation between imaging sensor and spatial orientation sensor, and relative orientation between imaging sensors. The system can work in either calibration mode or tracking mode.

BACKGROUND

Human computer interaction (HCI), or generally human machine interaction, focuses on design and use of computer technology as well as interfaces between a user and a computer. HCI depends on responsive, intuitive and accurate measurements of human input actions. Mouse, Keyboard and touch screen are conventional input devices that require user's hands-on controls. Some input devices like Microsoft Kinect® are capable of tracking the user's body or hand gestures without any physical contact. The word "user" and the word "person" may be used interchangeably in this disclosure.

The recent progress in virtual reality (VR) brought VR goggles to consumer market. VR goggles can create immersive three-dimensional (3D) experience to the user. The user can look around in virtual world by a turn of the head just like looking around in the real world.

Augmented reality (AR) is another area that is progressing fast. One major difference between AR and VR is that AR operates in real-time on real world scenes as opposed to solely computer created or recorded scenes in VR. In both VR and AR, it will be very useful to know where the user is looking at and what actions the user wants to take on the intended targets. Effective and reliable eye tracking will enable a broad range of applications under such circumstances.

Self-driving vehicles are also taking the front stage nowadays. There are situations where a car in its autonomous mode might need a driver's attention due to updated road or traffic conditions or driving mode changes. As such, it is useful to constantly monitor where the driver is looking at.

Machine learning and artificial intelligence (AI) may work in a cycle of learning, modeling and predicting. Quick and intuitive tracking the user's attention point for data acquisition and confirmation can play an important role in this loop.

SUMMARY

Disclosed herein is a method comprising: obtaining a first orientation of a first spatial orientation sensor and a first orientation of a second spatial orientation sensor; obtaining a second orientation of the first spatial orientation sensor and a second orientation of the second spatial orientation sensor; obtaining a third orientation of the first spatial orientation sensor and a third orientation of the second spatial orientation sensor; obtaining a fourth orientation of the first spatial orientation sensor and a fourth orientation of the second spatial orientation sensor; determining a relative orientation of the first spatial orientation sensor with respect to the second spatial orientation sensor based on the first orientation of the first spatial orientation sensor, the second orientation of the first spatial orientation sensor, the third orientation of the first spatial orientation sensor, the fourth orientation of the first spatial orientation sensor, the first orientation of the second spatial orientation sensor, the second orientation of the second spatial orientation sensor, the third orientation of the second spatial orientation sensor, and the fourth orientation of the second spatial orientation sensor; wherein the relative orientation of the first spatial orientation sensor with respect to the second spatial orientation sensor is fixed.

According to an embodiment, at least three of the first orientation of the first spatial orientation sensor, the second orientation of the first spatial orientation sensor, the third orientation of the first spatial orientation sensor, and the fourth orientation of the first spatial orientation sensor are different from one another; wherein the first orientation of the first spatial orientation sensor and the second orientation of the first spatial orientation sensor are different; wherein the third orientation of the first spatial orientation sensor and the fourth orientation of the first spatial orientation sensor are different.

According to an embodiment, at least three of the first orientation of the second spatial orientation sensor, the second orientation of the second spatial orientation sensor, the third orientation of the second spatial orientation sensor, and the fourth orientation of the second spatial orientation sensor are different from one another; wherein the first orientation of the second spatial orientation sensor and the second orientation of the second spatial orientation sensor are different; wherein the third orientation of the second spatial orientation sensor and the fourth orientation of the second spatial orientation sensor are different.

According to an embodiment, determining the relative orientation of the first spatial orientation sensor with respect to the second spatial orientation sensor comprises: determining a relative orientation of the first spatial orientation sensor with respect to a reference frame; determining a relative orientation of the second spatial orientation sensor with respect to the reference frame; determining the relative orientation of the first spatial orientation sensor with respect to the second spatial orientation sensor based on the relative orientation of the first spatial orientation sensor with respect to the reference frame and the relative orientation of the second spatial orientation sensor with respect to the reference frame.

According to an embodiment, determining the relative orientation of the first spatial orientation sensor with respect to the reference frame is based on the first orientation of the first spatial orientation sensor, the second orientation of the first spatial orientation sensor, the third orientation of the first spatial orientation sensor, and the fourth orientation of the first spatial orientation sensor.

According to an embodiment, determining the relative orientation of the second spatial orientation sensor with respect to the reference frame is based on the first orientation of the second spatial orientation sensor, the second orientation of the second spatial orientation sensor, the third orientation of the second spatial orientation sensor, and the fourth orientation of the second spatial orientation sensor.

Disclosed herein is a method comprising: obtaining an image of a first point in a three-dimensional space and an image of a second point in the three-dimensional space, using an imaging sensor; determining a relative orientation of the imaging sensor with respect to a reference frame based on the image of the first point and the image of the second point; wherein the first point and the second point are fixed in the three-dimensional space.

According to an embodiment, determining the relative orientation of the imaging sensor with respect to the reference frame further comprises determining a vector between a reference point fixed with respect to the imaging sensor and the image of the first point and determining a vector between the reference point and the image of the second point; determining the relative orientation based on the vector and the vector.

According to an embodiment, the vector between the reference point and the image of the first point is a unit vector; wherein the vector between the reference point and the image of the second point is a unit vector.

Disclosed herein is a method comprising: obtaining a first image of a first point in a three-dimensional space and a second image of a second point in the three-dimensional space, using an imaging sensor at a first orientation; obtaining a third image of the first point and a fourth image of the second point, using the imaging sensor at a second orientation; determining a relative rotation of the imaging sensor between the first orientation and the second orientation, based on the first image, the second image, the third image and the fourth image; wherein the first point and the second point are fixed in the three-dimensional space.

According to an embodiment, determining the relative rotation comprises: determining a relative orientation of the imaging sensor at the first orientation with respect to a reference frame based on the first image and the second image; determining a relative orientation of the imaging sensor at the second orientation with respect to the reference frame based on the third image and the fourth image; determining the relative rotation of the imaging sensor between the first orientation and the second orientation based on the relative orientation of the imaging sensor at the first orientation with respect to the reference frame and the relative orientation of the imaging sensor at the second orientation with respect to the reference frame.

According to an embodiment, determining the relative orientation of the imaging sensor at the first orientation with respect to the reference frame comprises determining a vector between a reference point fixed with respect to the imaging sensor and the first image and determining a vector between the reference point and the second image.

Disclosed herein is a method comprising: determining a first relative rotation of an imaging sensor between a first orientation of the imaging sensor and a second orientation of the imaging sensor; determining a second relative rotation of the imaging sensor between a third orientation of the imaging sensor and a fourth orientation of the imaging sensor; determining a relative orientation of the imaging sensor with respect to a reference frame based on the first relative rotation and the second relative rotation.

According to an embodiment, determining the first relative rotation comprises: obtaining a first image of a first point in a three-dimensional space and a second image of a second point in the three-dimensional space, using the imaging sensor at the first orientation; obtaining a third image of the first point and a fourth image of the second point, using the imaging sensor at the second orientation; determining the first relative rotation based on the first image, the second image, the third image and the fourth image.

According to an embodiment, at least three of the first orientation, the second orientation, the third orientation and the fourth orientation are different from one another; wherein the first orientation and the second orientation are different; wherein the third orientation and the fourth orientation are different.

Disclosed herein is a method comprising: determining a relative orientation of an imaging sensor with respect to a reference frame based on a first relative rotation of the imaging sensor between a first orientation of the imaging sensor and a second orientation of the imaging sensor and based on a second relative rotation of the imaging sensor between a third orientation of the imaging sensor and a fourth orientation of the imaging sensor; determining a first output, a second output, a third output, and a fourth output, of a spatial orientation sensor when the imaging sensor is respectively at the first orientation, at the second orientation, at the third orientation, and at the fourth orientation; determining a relative orientation of the spatial orientation sensor with respect to the reference frame based on the first output, the second output, the third output, and the fourth output; determining a relative orientation of the spatial orientation sensor with respect to the imaging sensor based on the relative orientation of the spatial orientation sensor with respect to the reference frame and based on the relative orientation of the imaging sensor with respect to the reference frame.

According to an embodiment, the relative orientation of the spatial orientation sensor with respect to the imaging sensor is fixed.

According to an embodiment, the method further comprises determining the first relative rotation by: obtaining a first image of a first point in a three-dimensional space and a second image of a second point in the three-dimensional space, using the imaging sensor at the first orientation; obtaining a third image of the first point and a fourth image of the second point, using the imaging sensor at the second orientation; determining the first relative rotation based on the first image, the second image, the third image and the fourth image.

According to an embodiment, at least three of the first orientation, the second orientation, the third orientation and the fourth orientation are different from one another; wherein the first orientation and the second orientation are different; wherein the third orientation and the fourth orientation are different.

Disclosed herein is a method comprising: determining a first relative orientation of a first spatial orientation sensor with respect to a first imaging sensor based on a relative orientation of the first spatial orientation sensor with respect to a first reference frame and based on a relative orientation of the first imaging sensor with respect to the first reference frame; determining a second relative orientation of a second spatial orientation sensor with respect to a second imaging sensor based on a relative orientation of the second spatial orientation sensor with respect to a second reference frame and based on a relative orientation of the second imaging sensor with respect to the second reference frame; determining a third relative orientation of the first spatial orientation sensor with respect to the second spatial orientation sensor; determining a fourth relative orientation of the first imaging sensor with respect to the second imaging sensor based on the first relative orientation, the second relative orientation and the third relative orientation.

According to an embodiment, the first spatial orientation sensor, the second spatial orientation sensor, the first imaging sensor and the second imaging sensor have fixed relative orientations with respect to one another.

Disclosed herein is a method comprising: obtaining a first image of a first point in a three-dimensional space and a second image of a second point in the three-dimensional space, using an imaging sensor at a first orientation; obtaining a third image of the first point and a fourth image of the second point, using the imaging sensor at a second orientation; obtaining a first output and a second output of a spatial orientation sensor when the imaging sensor is respectively at the first orientation and at the second orientation; determining a focal length of the imaging sensor based on the first image, the second image, the third image, the fourth image, the first output and the second output.

According to an embodiment, determining the focal length comprises determining a relative rotation of the imaging sensor between the first orientation and the second orientation, based on the first image, the second image, the third image and the fourth image.

According to an embodiment, the imaging sensor and the spatial orientation sensor have fixed orientation with respect to each other.

Disclosed herein is a method comprising: obtaining a first output, a second output, a third output, and a fourth output, of a spatial orientation sensor when the spatial orientation sensor is respectively at a first orientation, at a second orientation, at a third orientation, and at a fourth orientation; determining a relative orientation of the spatial orientation sensor with respect to a reference frame based on the first output, the second output, the third output, and the fourth output.

According to an embodiment, at least three of the first orientation, the second orientation, the third orientation, and the fourth orientation are different from one another; wherein the first orientation and the second orientation are different; wherein the third orientation and the fourth orientation are different.

Disclosed herein is a method comprising: obtaining a first relative orientation of a person's eye with respect to a first imaging sensor, based on an image obtained using the first imaging sensor; obtaining a second relative orientation of a second imaging sensor with respect to the first imaging sensor; determining a third relative orientation of the eye with respect to the second imaging sensor based on the first relative orientation and the second relative orientation.

Disclosed herein is a machine-readable non-transitory medium having instructions recorded thereon, the instructions when executed by a computer implementing any of the methods above.

Disclosed herein is an apparatus comprising: a first imaging sensor; a second imaging sensor; a first spatial orientation sensor; a second spatial orientation sensor; wherein the first spatial orientation sensor, the second spatial orientation sensor, the first imaging sensor and the second imaging sensor have fixed relative orientations with respect to one another; and a computing device comprising a processor and the machine-readable non-transitory medium above.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components have been described at a relatively high-level, without detail, in order to avoid unnecessarily obscuring aspects of the present teachings.

A 3D coordinate system using the right hand rule is defined in Part A1.1 of the Appendix section. A 2D coordinate system for camera image frame is defined in Part A1.2 of the Appendix section.

Mathematical utility functions used in this disclosure are listed in Part A2 of the Appendix section. Quaternion, vector and matrix mathematics is discussed herein. Quaternions are widely used in this disclosure. A function using quaternions can also be expressed using matrices, Euler angles or other suitable mathematic expressions.

In abbreviations in the form of "A_B_C" used in this disclosure: A represents the type; B represents the specific; C represents the context. As an example, an abbreviation "qch" means a quaternion "q" representing the orientation of a camera "c" in the head coordinate system "h." See Part A2 of the Appendix section.

A spatial orientation sensor measures its own orientation in a 3D space. In one embodiment, two spatial orientation sensors GE and GF are mounted on a frame so that their relative orientation does not change. In a calibration process, using the methods described in this disclosure (see Part C5 in the Methods section, for example), the orientation of the spatial orientation GE relative to spatial orientation GF can be obtained. As spatial orientation sensors can be attached to other objects to measure their orientation in the 3D space, a relative orientation between two objects can be measured by having two spatial orientation sensors respectively attached to the objects.

Figure 5:
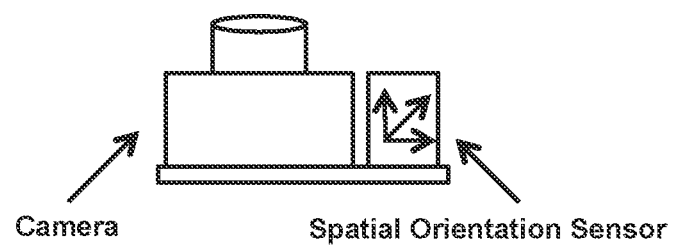
FIG. 5 shows that a camera may have a spatial orientation sensor attached thereto.

Cameras may be used as imaging sensors. The word "imaging sensor" and the word "camera" may be used interchangeably in this disclosure. In one embodiment, a camera is attached with a spatial orientation sensor. The camera and the spatial orientation sensor may be mounted on a rigid frame, as shown in FIG. 5, so that their relative orientation does not change. The relative orientation of the camera to the spatial orientation sensor can be obtained using the system and method described in Part C9 in the Methods section.

Figure 6:
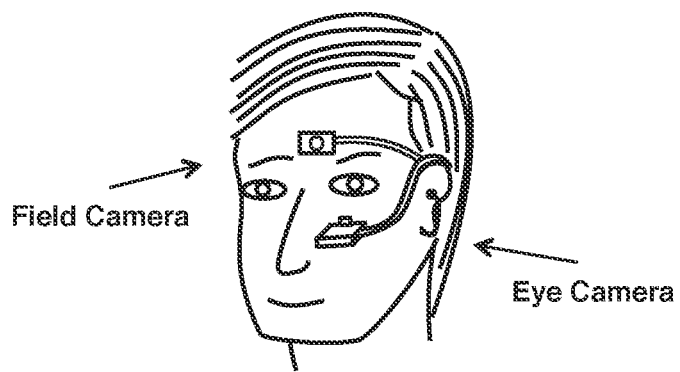
FIG. 6 shows that an eye camera and a field camera are attached to a harness frame worn by a user.

In an embodiment, there may be two cameras CE and CF. Each of the cameras is attached with a spatial orientation sensor. The spatial orientation sensor attached to the camera CE is called GE. The spatial orientation sensor attached to the camera CF is called GF. The relative orientation of the two cameras CE and CF does not change. Therefore, based on the orientation of the camera CE relative to the spatial orientation sensor GE, the orientation of the camera CF relative to the spatial orientation sensor GF, and the orientation of the spatial orientation sensor GE relative to the spatial orientation sensor GF, the orientation of the camera CE relative to the camera CF can be obtained, for example, using the system and method describe in Part C10 in the Methods section. This system and method can be used in a wearable eye tracking system with multiple imaging sensors, multiple spatial orientation sensors, computing devices and storage devices to detect and record where the user is looking at. In an embodiment, the camera CE is disposed facing an eye of the user and is called the eye camera; and the camera CF is disposed facing away from the eye and is called the field camera. As shown in FIG. 6, the eye camera CE takes images of the eye and the field camera CF takes images of the scene in front of the user.

A gaze vector is the unit vector pointing from the center of the eye to the gaze point, which is the point the user is looking at. A gaze vector represents the orientation of the eye.

Assuming a gaze vector in the coordinate system of the eye camera CE is known, the gaze vector can be converted to the coordinate system of the field camera CF, for example using the method in Part C12 in the Methods section. The converted gaze vector in the coordinate system of the field camera CF can be further converted to a point in the 2D image plane of the field camera CF, making it possible to mark where the user is looking at using the method in Part C13 in the Methods section.

The system and methods described in this disclosure can also be used in other systems that use multiple cameras and multiple spatial orientation sensors, such as panorama camera system that takes images from multiple cameras at a time and stitch them together to make a single image. In one embodiment, the camera CE and camera CF are arranged facing different directions with certain amount of overlap in their fields of view. Images taken by these two cameras may be stitched based on the relative orientation of the two cameras. In one embodiment, the image of a point in the 3D space in the image plane of the camera CE can be determined based on the image of the point in the image plane of the camera CF, or vice versa, based on the relative orientation of the two cameras. For example, when the user specifies a point in the image taken by one camera, the corresponding point in the image taken by the other camera can be obtained. More than two cameras and more than two spatial orientation sensors can be calibrated using the systems and methods described in this disclosure.

In a calibration process, using the systems and methods describe in this disclosure (see, for example, Part C11 in the Methods section), the camera focal length can be obtained.

Figure 4:
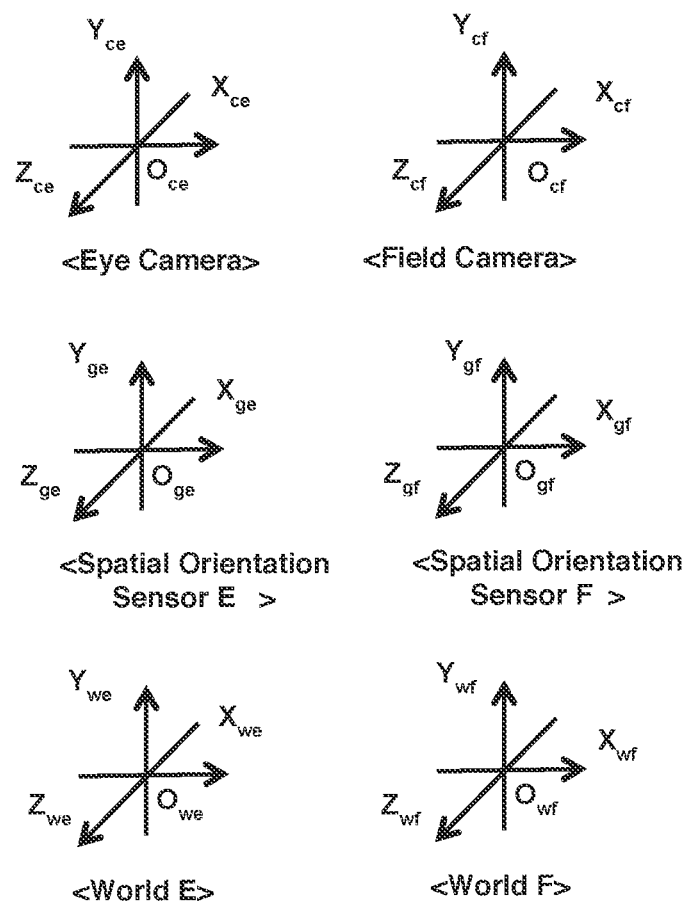
FIG. 4 shows several 3D coordinate systems referred to herein.

Each camera and each spatial orientation sensor have their own coordinate system as shown in FIG. 4. They are:

Camera CE coordinate system Xce-Yce-Zce-Oce, which is abbreviated as CS-CE;

Camera CF coordinate system Xcf-Ycf-Zcf-Ocf, which is abbreviated as CS-CF;

Spatial orientation sensor GE coordinate system Xge-Yge-Zge-Oge, which is abbreviated as CS-GE;

Spatial orientation sensor GF coordinate system Xgf-Ygf-Zgf-Ogf, which is abbreviated as CS-GF;

Wold coordinate system related to GE Xwe-Ywe-Zwe-Owe, which is abbreviated as CS-WE;

World coordinate system related to GF Xwf-Ywf-Zwf-Owf, which is abbreviated as CS-WF.

A generic world coordinate system Xw-Yw-Zw-Ow is abbreviated as CS-W. A generic camera coordinate system Xc-Yc-Zc-Oc is abbreviated as CS-C. A generic spatial orientation sensor coordinate system Xg-Yg-Zg-Og is abbreviated as CS-G.

Various hardware components may be used to implement the functions and processes in this disclosure. One hardware component is a camera. The camera may measure the brightness, or brightness and color, of light. The term "camera coordinate system" or "CS-C" is used interchangeably with the term "imaging sensor coordinate system" or "CS-I" in this disclosure. The camera can capture color images or grayscale images. The camera can capture infrared images or non-infrared (e.g., visible light) images. Parameters of a camera include its physical dimensions, resolution and focal length of its lens. A 2D camera image frame coordinate system is defined in Part A1.2 of the Appendix section.

One hardware component is a head gear that fixes the camera to the user's head. The head gear can be a glasses frame, a head band or a helmet, depending on the applications. Other forms of head gear are possible.

One hardware component is a computer such as an embedded system or a desktop system.

In an embodiment as shown in FIG. 6, which can be used as an eye tracking and gaze point recording system, an eye camera and a field camera are attached to a harness frame worn by the user. The relative orientation between the two cameras does not change. The orientations of the two cameras relative to the user's head do not change, either. Each camera has a spatial orientation sensor attached thereto as shown in FIG. 5. The orientation of the camera relative to the spatial orientation sensor does not change.

Obtaining the relative orientation of a reference coordinate system relative to a spatial orientation sensor from two rotation vectors is described below.

A spatial orientation sensor can be attached to a physical object to measure its orientation relative to the spatial orientation sensor. The orientation of a reference coordinate system CS-R in a spatial orientation sensor coordinate system CS-G can be described using a quaternion. Based on this quaternion, the coordinate system CS-R can be uniquely determined. For example, as described in Part C1 or Part C3 in the Methods section, this quaternion can be determined by two vectors in the spatial sensor coordinate system. For example, as described in Part C2 or Part C4 in the Methods section, the two vectors can be obtained by two orientation outputs from the spatial orientation sensor.

Obtaining the relative orientation of two spatial orientation sensors is described below.

When two spatial orientation sensors are mounted on a frame and their relative orientation does not change, the relative orientation of these two spatial orientation sensors can be obtained, for example, using the method described in Part C5 in the Methods section. This can be done by finding the relative orientations of a common reference coordinate system to the spatial orientation sensors as described above and by obtaining the relative orientation of these two spatial orientation sensors based on the relative orientations.

Obtaining the relative orientation of a reference coordinate system relative to a camera from images of a pair of fixed points in 3D space in the camera's field of view is described below.

The orientation of a reference coordinate system CS-AB in a camera coordinate system CS-C can be described using a quaternion. Based on this quaternion, the coordinate system CS-AB can be uniquely determined. For example, as described in Part C1 of the Methods section, this quaternion can be determined by two vectors in the camera coordinate system. For example, as described in Part C6 of the Methods section, the two vectors can be obtained by using the images of a pair of fixed points in 3D space in the camera's field of view.

Obtaining a rotation vector from orientation change of the reference coordinate system in camera coordinate system is described below.

As describe above, the relative orientation of a reference coordinate system relative to the camera can be obtained using the images of a pair of fixed points in 3D space in the camera's field of view. By repeat this procedure at two different camera orientations, two orientations of the reference coordinate system relative to the coordinate system of the camera can be obtained. Based on these two orientations, a rotation vector in the camera coordinate system can be determined, for example, as described in Part C7 or Part C2 of the Methods section.

Obtaining relative orientation of another reference coordinate system relative to a camera from two rotation vectors is described below.

As describe in above, a rotation vector in the camera coordinate system can be determined by using a pair of fixed points in 3D pace in the camera's field of view at two difference camera orientations. By doing this with two different pairs of fixed points in 3D pace in camera's field of view, two rotation vectors can be obtained, for example, as described in Part C8 in the Methods section. Based on these two rotation vectors, the orientation of another reference coordinate system relative to the coordinate system of the camera can be obtained, for example, using the method described in Part C1 in the Methods section.

Obtaining orientation of a camera relative to a spatial orientation sensor is described below.

Assuming the orientation of the camera relative to the spatial orientation sensor does not change, for example, when they are mounted on a rigid frame, the orientation of a reference coordinate system relative to the spatial orientation sensor can be determined from two rotation vectors and the orientation of another reference coordinate system relative to the camera can be determined from two rotation vectors as described above. Because the orientation of the camera relative to the spatial orientation sensor does not change, if these reference frames are obtained at the same time from the same orientation changes, these reference frames are the same, and the orientation of the camera relative to the spatial orientation sensor can be obtained using the method describe in Part C9 in the Methods section.

Obtaining the relative orientation of two cameras is described below.

If the relative orientation of two cameras does not change (e.g., when they are mounted on a rigid frame) and assuming each camera is rigidly attached to a spatial orientation sensor, then the relative orientation of the two spatial orientation sensors does not change either. The orientation of each camera relative to its attached spatial orientation sensor can be determined and the relative orientation of the two spatial orientation sensors can be determined, as described above. Using the method described in Part C9 in the Methods section, the relative orientation between the two cameras can be obtained.

Obtaining the focal length of a camera is described below.

The focal length of a camera may be used for calculating the reference coordinate system and rotation vectors referred to in Part C6 or Part C7 in the Methods section. The focal length may be obtained using the method described in Part C11 in the Methods section.

At a given value of the focal length, a rotation vector and the amount of rotation may be obtained at two camera orientations using the method described in Part C7 in the Methods section. During this process, two orientation outputs from a spatial orientation sensor rigidly attached to the camera may be also obtained. A rotation vector and the amount of rotation may be obtained based on the two orientation outputs, using the method described in Part C2 or Part C4 in the Methods section. The rotation vector and the amount of rotation may be compared to those obtained in the same process but with a set of known focal lengths and the difference between them can be used to estimate the focal length of the camera.

Converting a vector from the coordinate system of one camera to the coordinate system of another camera is described below.

If the relative orientation of one camera relative to another camera is known, a vector in the coordinate system of one camera can be converted to a vector in the coordinate system of the other camera, for example, as described in Part C12 or Part C13 of the Methods section.

Converting gaze vector between eye camera and field camera is described below.

In a system with an eye camera CE facing the user's eye and a field camera CF facing outward to the world, the gaze vector can be converted from the coordinate system of the eye camera CE to the coordinate system of the field camera CF or vice versa, as described above. The gaze vector in the coordinate system of the field camera CF can be mapped into a point in the image plane of the field camera CF.

Converting a point from one camera's image plane to another camera's image plane is described below.

A vector in the coordinate system of a camera can be mapped to a point in the image plane of the camera. See Part A1.3 in the Appendix section. A point in the image plane of the camera can be mapped to its coordinate system. See Part A1.4 in Appendix section. Knowing the relative orientation of the cameras, a point in one camera's image plane can be mapped into another camera's image plane. This can be used to stitch images obtained by multiple cameras.

Figure 7A:
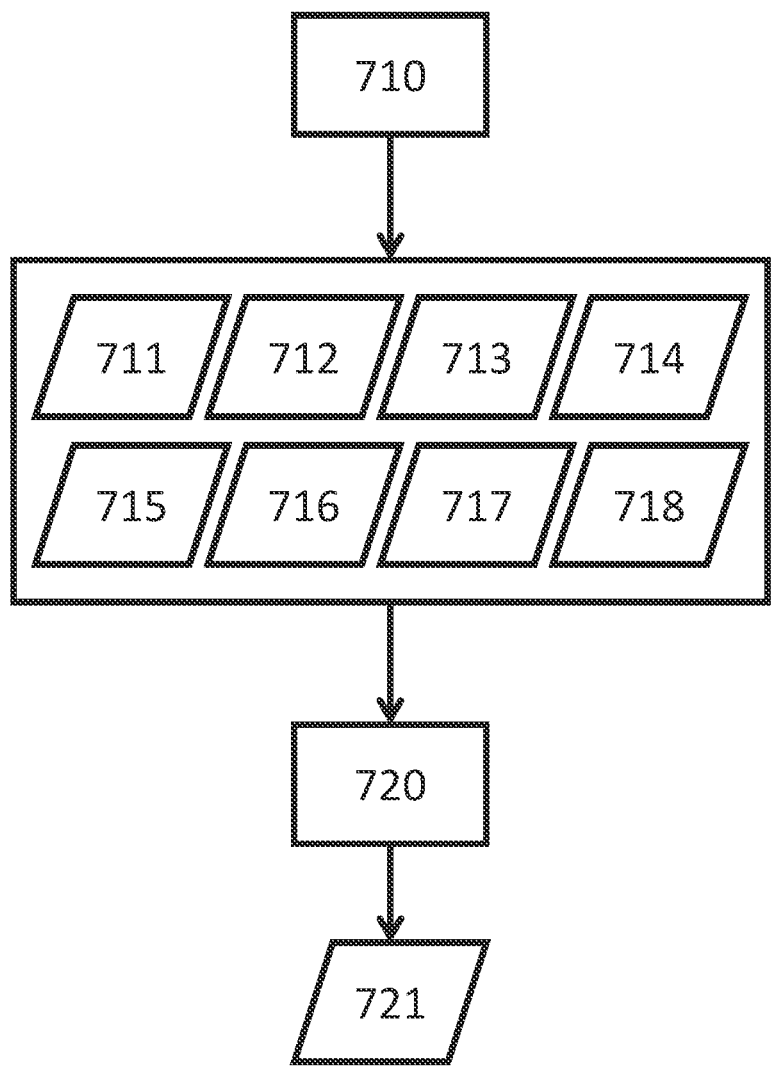
FIG. 7A schematically shows a flowchart of a method, according to an embodiment.

FIG. 7A schematically shows the flowchart of a method, according to another embodiment. In procedure 710, first orientation 711, second orientation 712, third orientation 713 and fourth orientation 714 of a first spatial orientation sensor and first orientation 715, second orientation 716, third orientation 717 and fourth orientation 718 of a second spatial orientation sensor are obtained. In procedure 720, a relative orientation 721 of the first spatial orientation sensor with respect to the second spatial orientation sensor is determined based on the first orientation 711, the second orientation 712, the third orientation 713 and the fourth orientation 714 of the first spatial orientation sensor and based on the first orientation 715, the second orientation 716, the third orientation 717 and the fourth orientation 718 of the second spatial orientation sensor. The relative orientation 721 of the first spatial orientation sensor with respect to the second spatial orientation sensor is fixed.

Figure 7B:
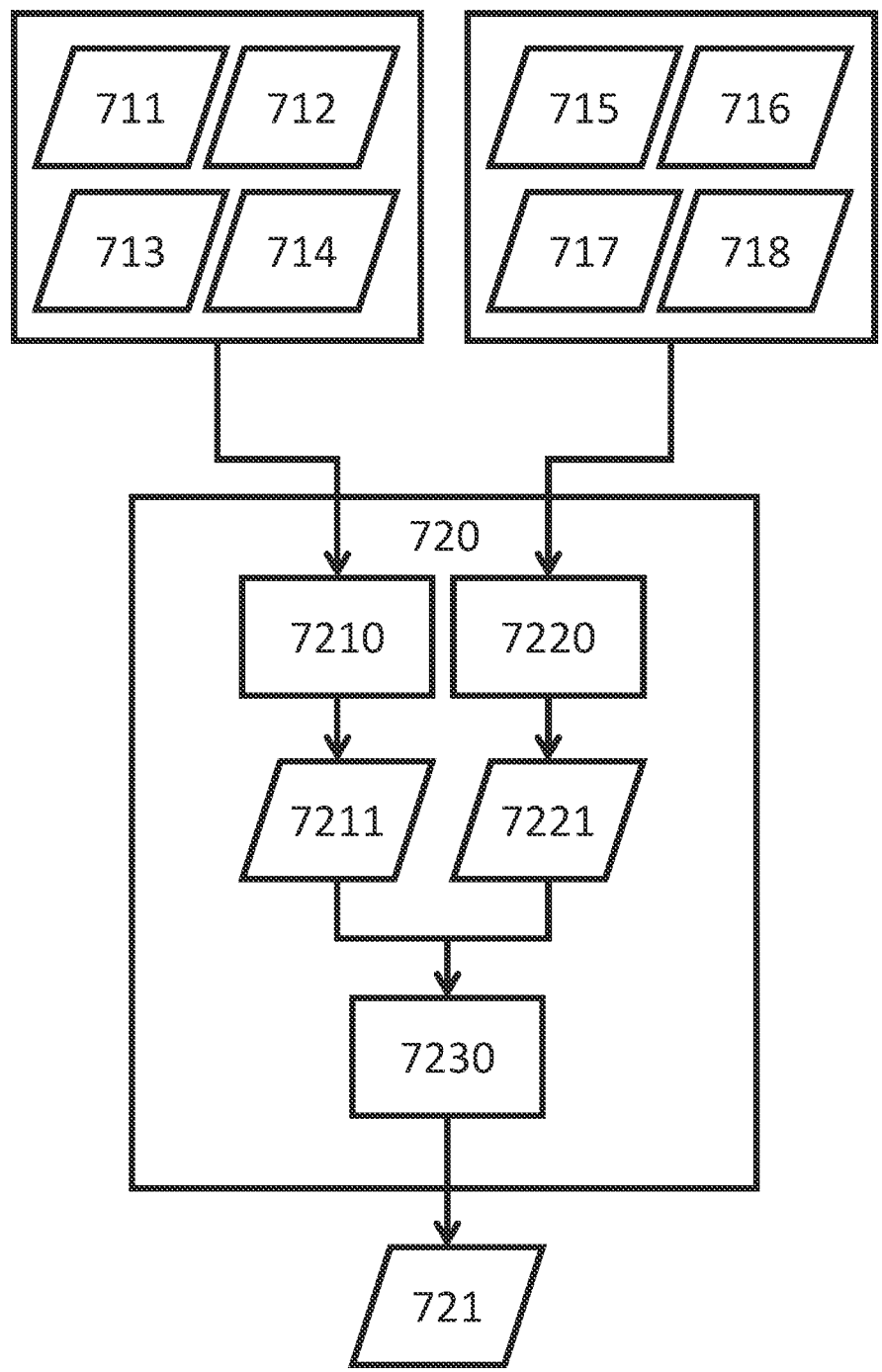
FIG. 7B shows a flowchart for a procedure in the flowchart of FIG. 7A.

FIG. 7B schematically shows an example of the details of procedure 720. In procedure 7210, a relative orientation 7211 of the first spatial orientation sensor with respect to a reference frame is determined. In procedure 7220, a relative orientation 7221 of the second spatial orientation sensor with respect to the reference frame is determined. In an embodiment, determining the relative orientation 7211 of the first spatial orientation sensor with respect to the reference frame in procedure 7210 is based on the first orientation 711, the second orientation 712, the third orientation 713 and the fourth orientation 714. In an embodiment, determining the relative orientation 7221 of the second spatial orientation sensor with respect to the reference frame in procedure 7220 is based on the first orientation 715, the second orientation 716, the third orientation 717 and the fourth orientation 718. In procedure 7230, the relative orientation 721 is determined based on the relative orientation 7211 of the first spatial orientation sensor with respect to the reference frame and the relative orientation 7221 of the second spatial orientation sensor with respect to the reference frame.

Figure 8A:
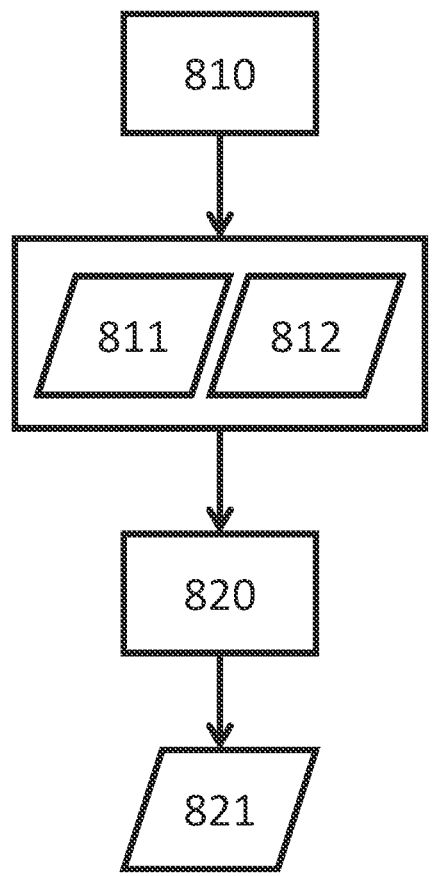
FIG. 8A schematically shows a flowchart of a method, according to an embodiment.

FIG. 8A schematically shows the flowchart of a method, according to another embodiment. In procedure 810, an image 811 of a first point in a 3D space and an image 812 of a second point in the 3D space are obtained using an imaging sensor. In procedure 820, a relative orientation 821 of the imaging sensor with respect to a reference frame is determined based on the image 811 and the image 812. The first point and the second point are fixed in the 3D space.

Figure 8B:
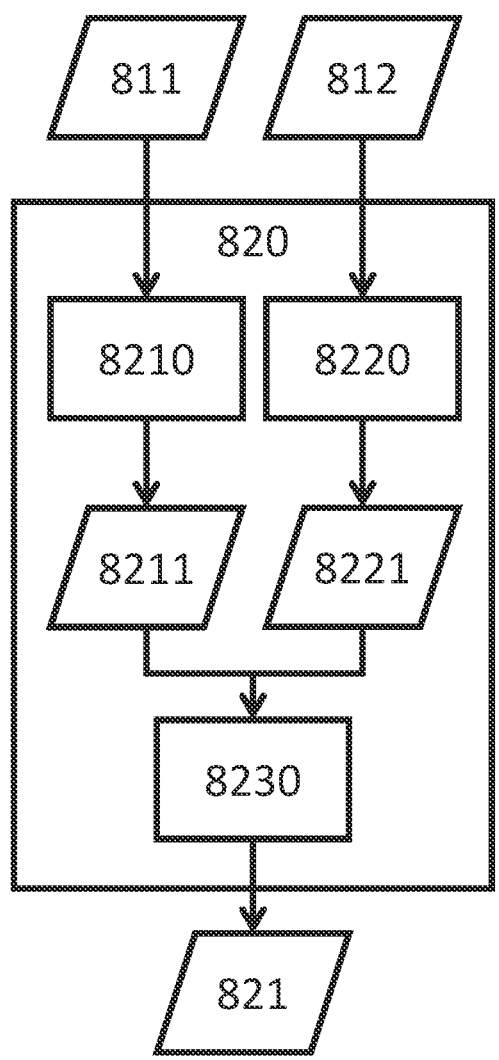
FIG. 8B shows a flowchart for a procedure in the flowchart of FIG. 8A.

FIG. 8B schematically shows an example of the details of procedure 820. In procedure 8210, a vector 8211 between a reference point fixed with respect to the imaging sensor and the image 811 of the first point is determined. In procedure 8220, a vector 8221 between the reference point and the image 822 of the second point is determined. In procedure 8230, the relative orientation 821 is determined based on the vector 8211 and the vector 8221.

Figure 9A:
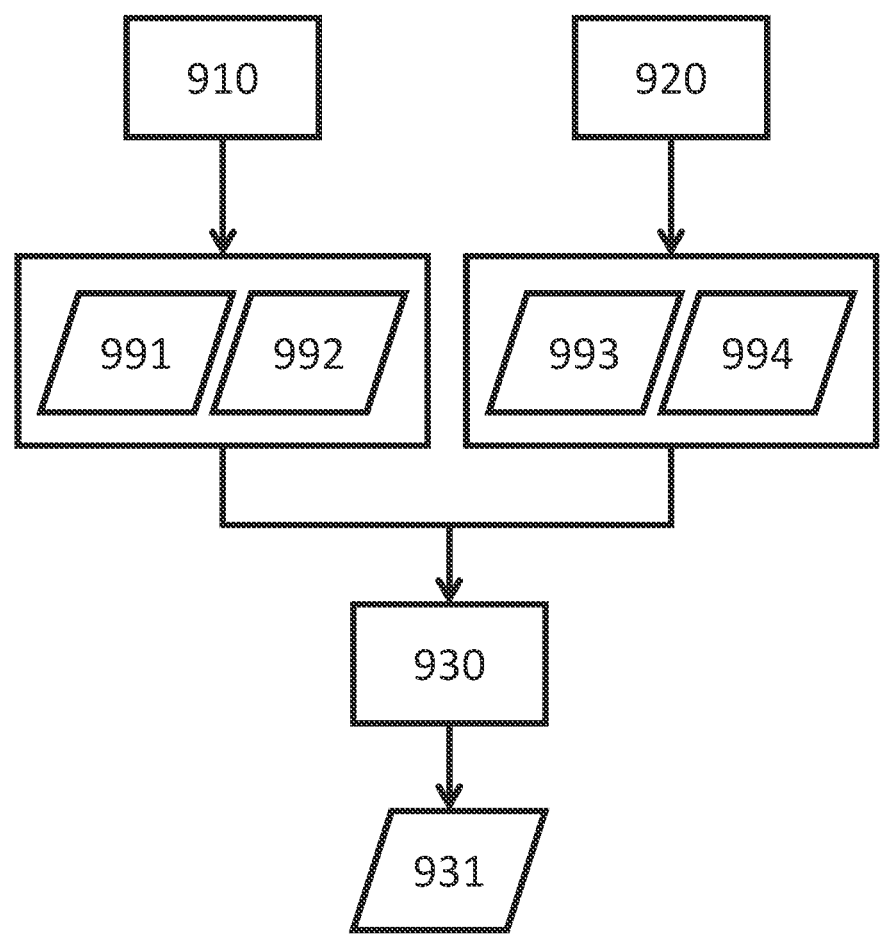
FIG. 9A schematically shows a flowchart of a method, according to an embodiment.

FIG. 9A schematically shows the flowchart of a method, according to another embodiment. In procedure 910, a first image 991 of a first point in a 3D space and a second image 992 of a second point in the 3D space are obtained, using an imaging sensor at a first orientation. In procedure 920, a third image 993 of the first point and a fourth image 994 of the second point are obtained, using the imaging sensor at a second orientation. In procedure 930, a relative rotation 931 of the imaging sensor between the first orientation and the second orientation is obtained based on the first image 991, the second image 992, the third image 993 and the fourth image 994. The first point and the second point are fixed in the 3D space.

Figure 9B:
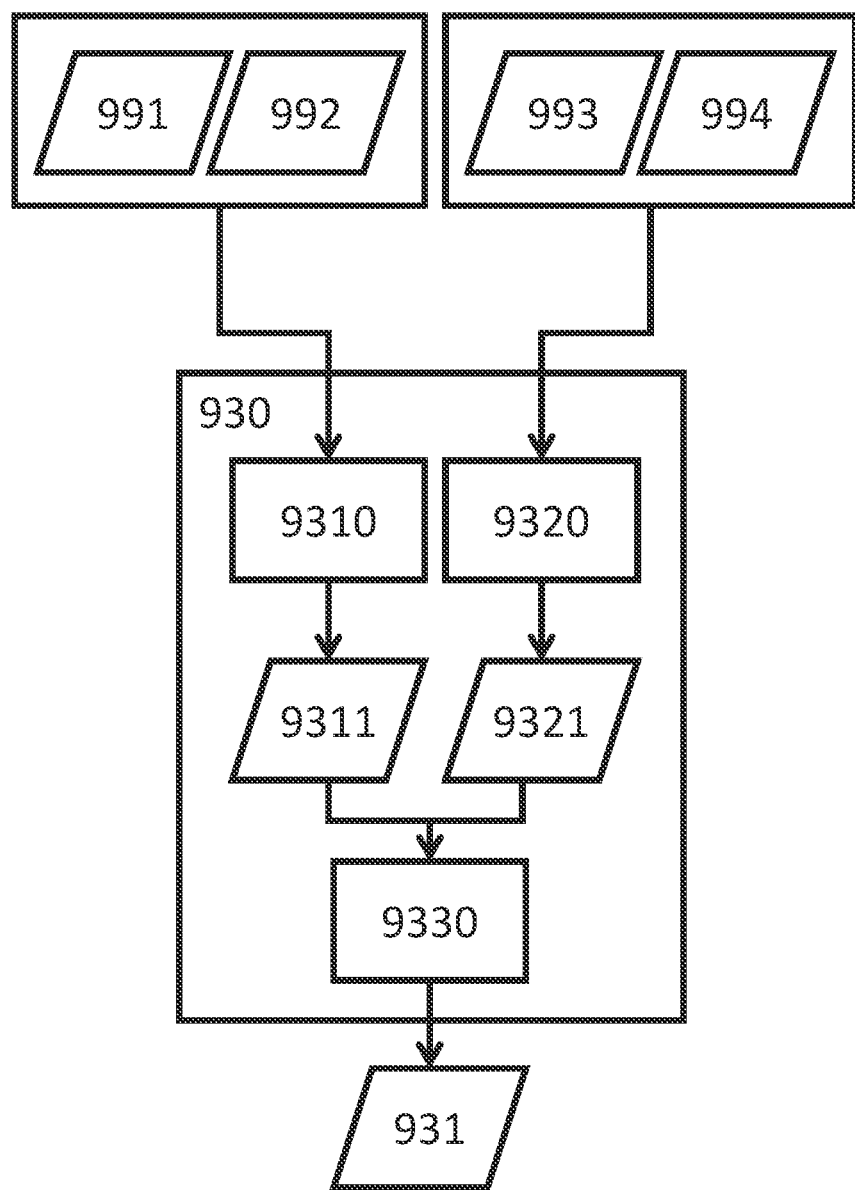
FIG. 9B shows a flowchart for a procedure in the flowchart of FIG. 9A.

FIG. 9B schematically shows an example of the details of procedure 930. In procedure 9310, a relative orientation 9311 of the imaging sensor at the first orientation with respect to a reference frame is determined based on the first image 991 and the second image 992. In procedure 9320, a relative orientation 9321 of the imaging sensor at the second orientation with respect to the reference frame is determined based on the third image 993 and the fourth image 994. In procedure 9330, the relative rotation 931 is determined based on the relative orientation 9311 and the relative orientation 9321.

Figure 10A:
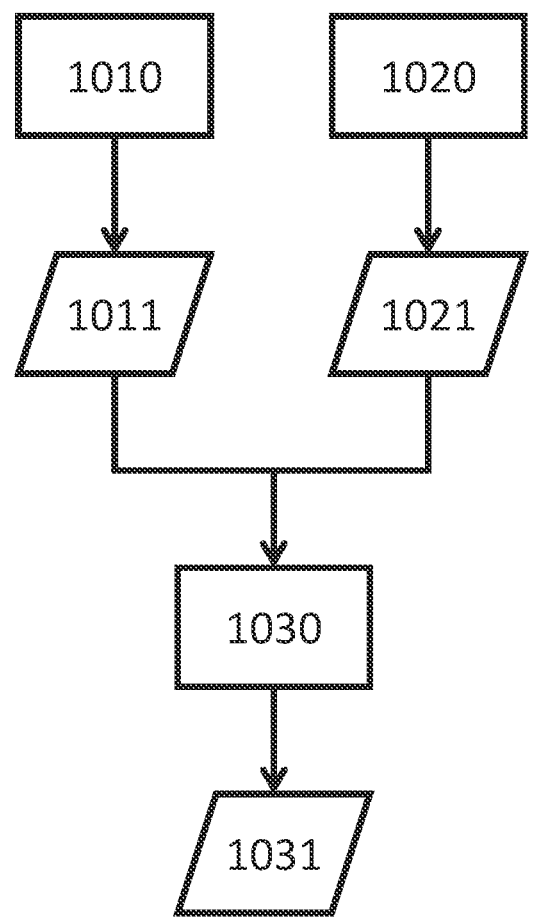
FIG. 10A schematically shows a flowchart of a method, according to an embodiment.

FIG. 10A schematically shows the flowchart of a method, according to another embodiment. In procedure 1010, a first relative rotation 1011 of an imaging sensor between a first orientation of the imaging sensor and a second orientation of the imaging sensor is determined. In procedure 1020, a second relative rotation 1021 of the imaging sensor between a third orientation of the imaging sensor and a fourth orientation of the imaging sensor is determined. In procedure 1030, a relative orientation 1031 of the imaging sensor with respect to a reference frame is determined based on the first relative rotation 1011 and the second relative rotation 1021.

Figure 10B:
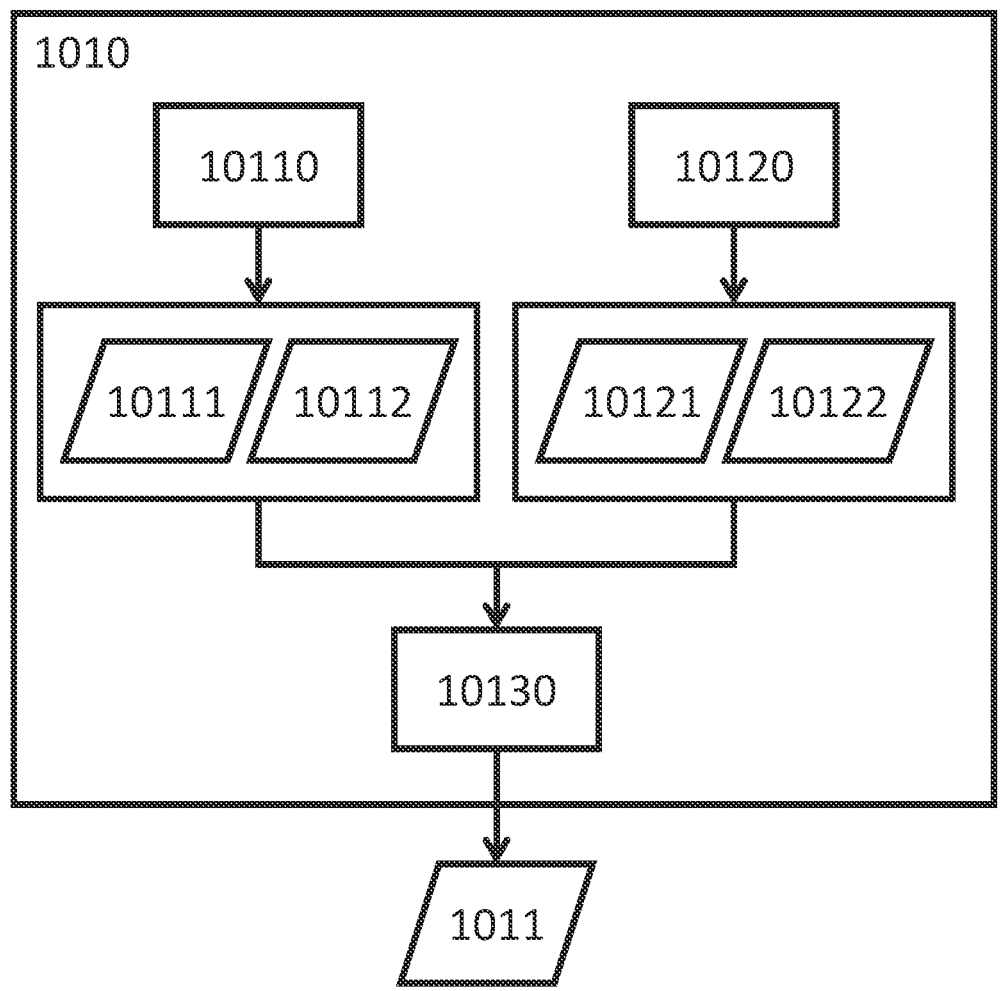
FIG. 10B shows a flowchart for a procedure in the flowchart of FIG. 10A.

FIG. 10B schematically shows an example of the details of procedure 1010. In procedure 10110, a first image 10111 of a first point in a 3D space and a second image 10112 of a second point in the 3D space are obtained using the imaging sensor at the first orientation. In procedure 10120, a third image 10121 of the first point and a fourth image 10122 of the second point are obtained using the imaging sensor at a second orientation. In procedure 10130, the first relative rotation 1011 is determined based on the first image 10111, the second image 10112, the third image 10121 and the fourth image 10122.

Figure 11A:
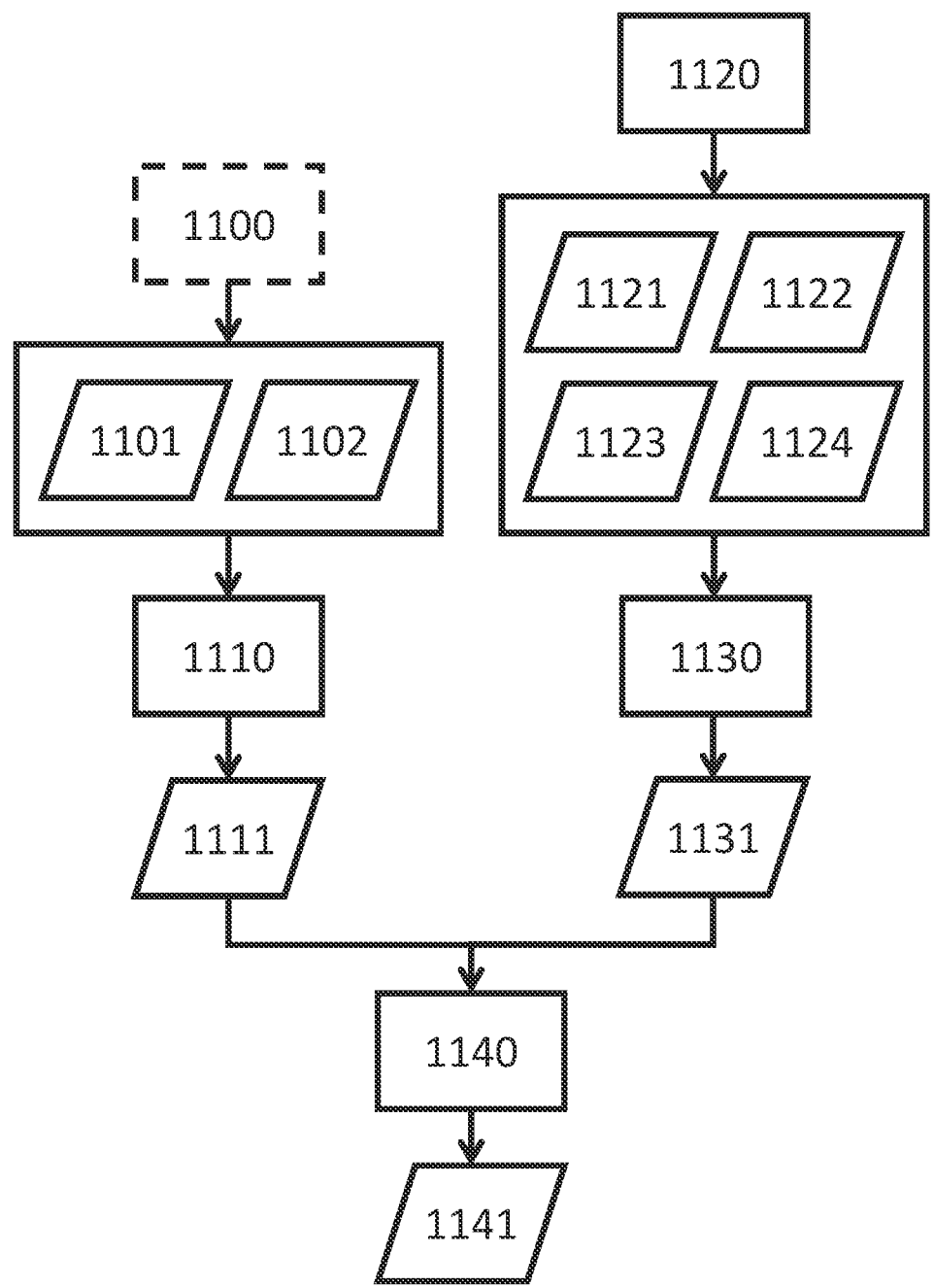
FIG. 11A schematically shows a flowchart of a method, according to an embodiment.

FIG. 11A schematically shows the flowchart of a method, according to another embodiment. In optional procedure 1100, a first relative rotation 1101 of an imaging sensor between a first orientation of the imaging sensor and a second orientation of the imaging sensor and a second relative rotation 1102 of the imaging sensor between a third orientation of the imaging sensor and a fourth orientation of the imaging sensor are determined. In procedure 1110, a relative orientation 1111 of the imaging sensor with respect to a reference frame is determined based on the first relative rotation 1101 and the second relative rotation 1102. In procedure 1120, a first output 1121, a second output 1122, a third output 1123, and a fourth output 1124, of a spatial orientation sensor when the imaging sensor is respectively at the first orientation, at the second orientation, at the third orientation, and at the fourth orientation are determined. In procedure 1130, a relative orientation 1131 of the spatial orientation sensor with respect to the reference frame is determined based on the first output 1121, the second output 1122, the third output 1123, and the fourth output 1124. In procedure 1140, a relative orientation 1141 of the spatial orientation sensor with respect to the imaging sensor is determined based on the relative orientation 1131 of the spatial orientation sensor with respect to the reference frame and based on the relative orientation 1111 of the imaging sensor with respect to the reference frame.

Figure 11B:
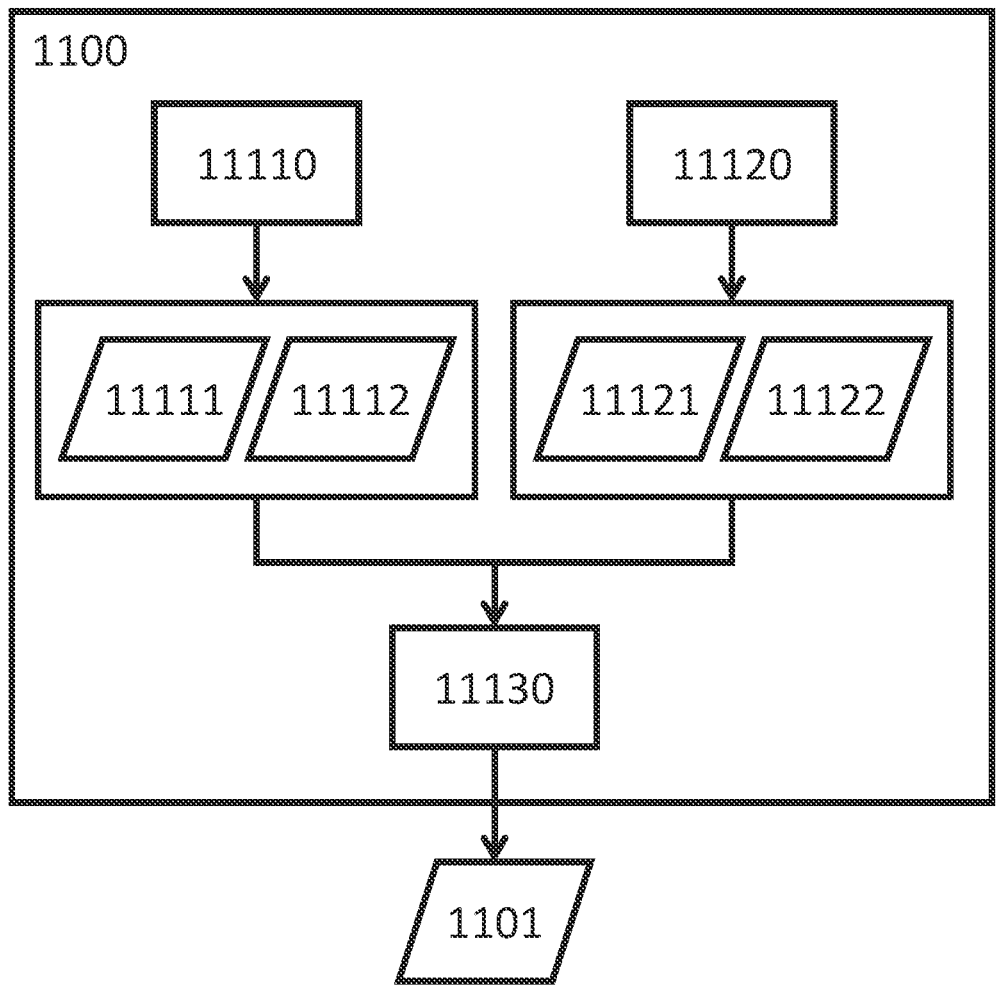
FIG. 11B shows a flowchart for a procedure in the flowchart of FIG. 11A.

FIG. 11B schematically shows an example of the details of the optional procedure 1100. In procedure 11110, a first image 11111 of a first point in a 3D space and a second image 11112 of a second point in the 3D space are obtained using the imaging sensor at the first orientation. In procedure 11120, a third image 11121 of the first point and a fourth image 11122 of the second point are obtained using the imaging sensor at a second orientation. In procedure 11130, the first relative rotation 1101 is determined based on the first image 11111, the second image 11112, the third image 11121 and the fourth image 11122.

Figure 12:
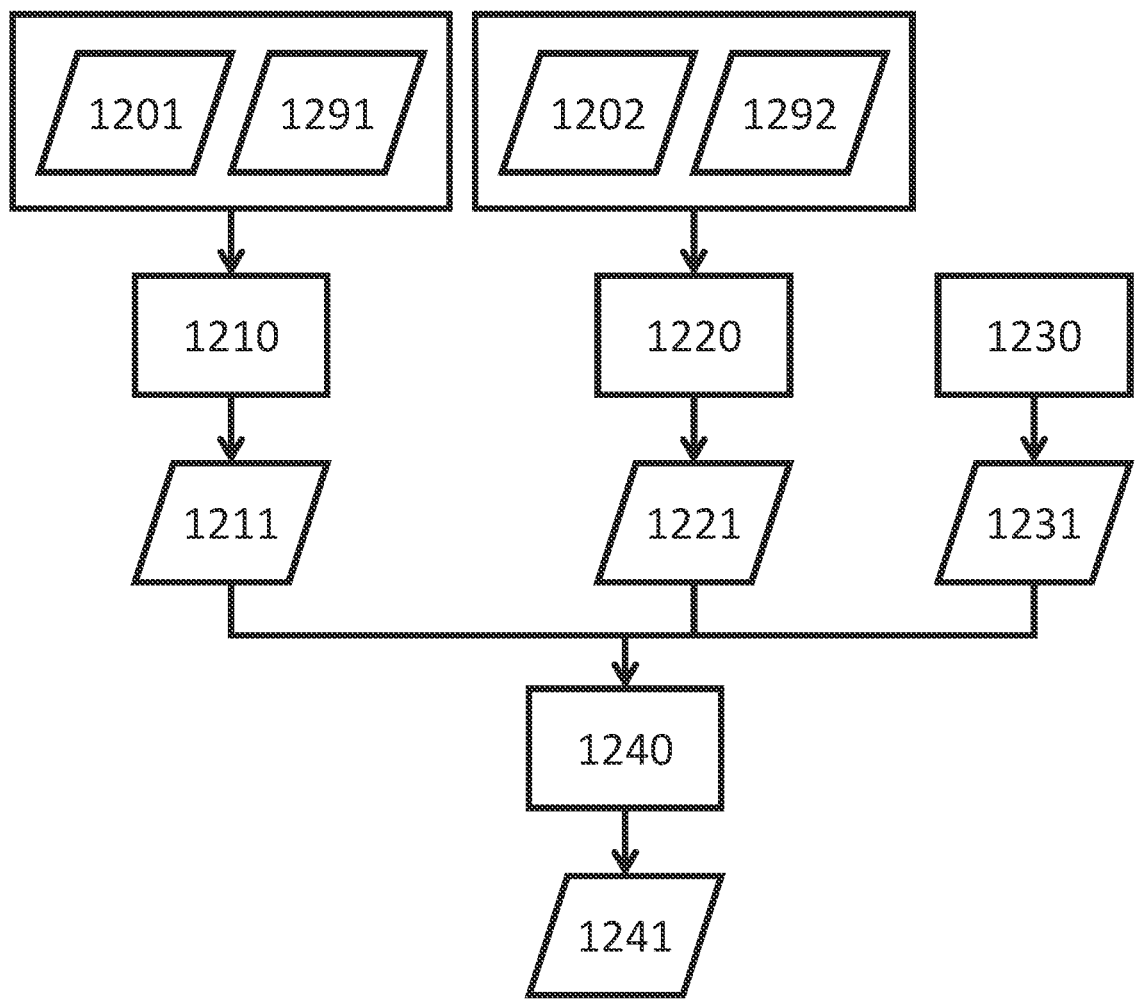
FIG. 12 schematically shows a flowchart of a method, according to an embodiment.

FIG. 12 schematically shows the flowchart of a method, according to another embodiment. In procedure 1210, a first relative orientation 1211 of a first spatial orientation sensor with respect to a first imaging sensor is determined based on a relative orientation 1201 of the first spatial orientation sensor with respect to a first reference frame and based on a relative orientation 1291 of the first imaging sensor with respect to the first reference frame. In procedure 1220, a second relative orientation 1221 of a second spatial orientation sensor with respect to a second imaging sensor is determined based on a relative orientation 1202 of the second spatial orientation sensor with respect to a second reference frame and based on a relative orientation 1292 of the second imaging sensor with respect to the second reference frame. In procedure 1230, a third relative orientation 1231 of the first spatial orientation sensor with respect to the second spatial orientation sensor is determined. In procedure 1240, a fourth relative orientation 1241 of the first imaging sensor with respect to the second imaging sensor is determined based on the first relative orientation 1211, the second relative orientation 1221 and the third relative orientation 1231.

Figure 13:
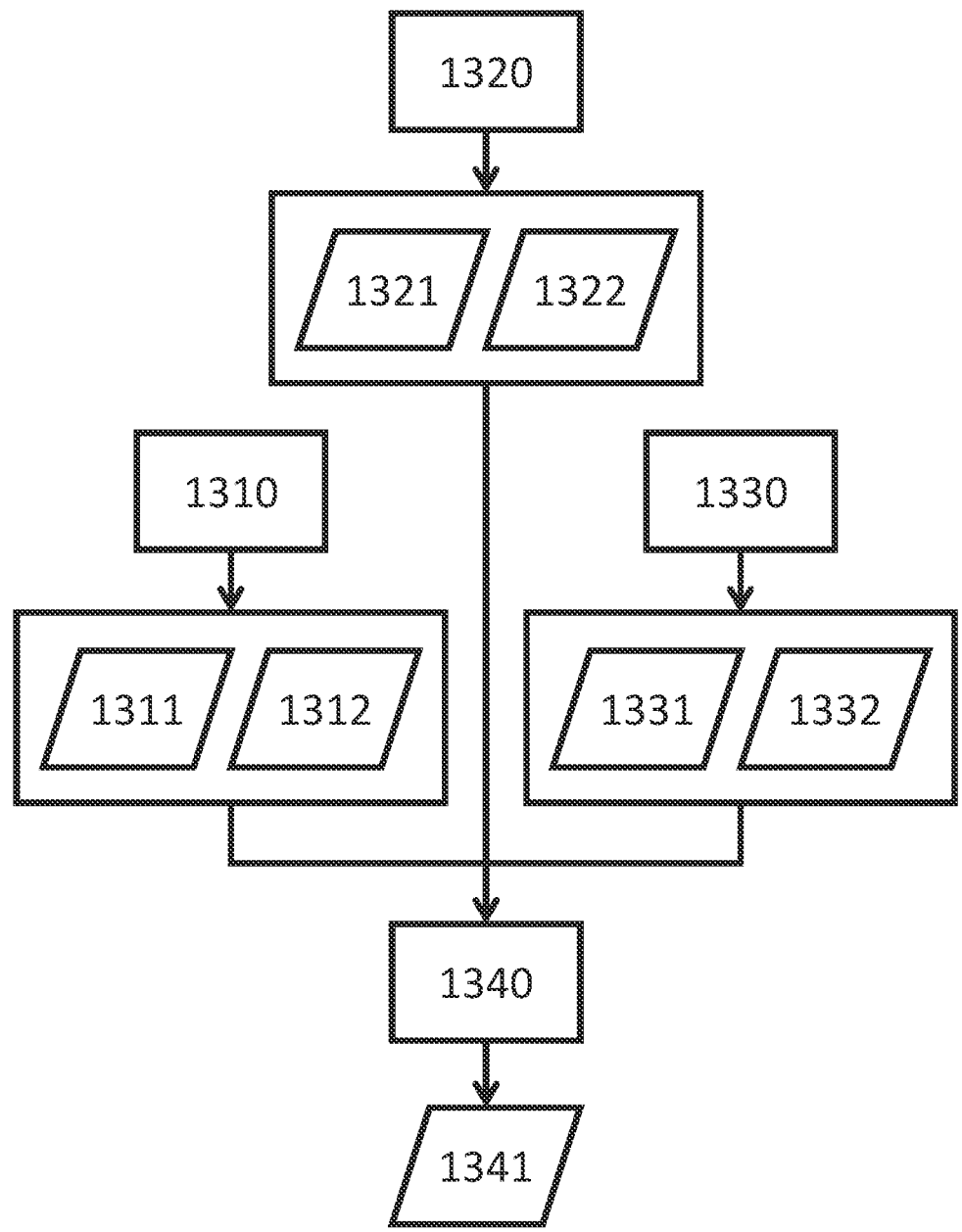
FIG. 13 schematically shows a flowchart of a method, according to an embodiment.

FIG. 13 schematically shows the flowchart of a method, according to another embodiment. In procedure 1310, a first image 1311 of a first point in a three-dimensional space and a second image 1312 of a second point in the three-dimensional space are obtained, using an imaging sensor at a first orientation. In procedure 1320, a third image 1321 of the first point and a fourth image 1322 of the second point are obtained, using the imaging sensor at a second orientation. In procedure 1330, a first output 1331 and a second output 1332 of a spatial orientation sensor are obtained when the imaging sensor is respectively at the first orientation and at the second orientation. In procedure 1340, a focal length 1341 of the imaging sensor is determined based on the first image 1311, the second image 1312, the third image 1321, the fourth image 1322, the first output 1331 and the second output 1332.

Figure 14:
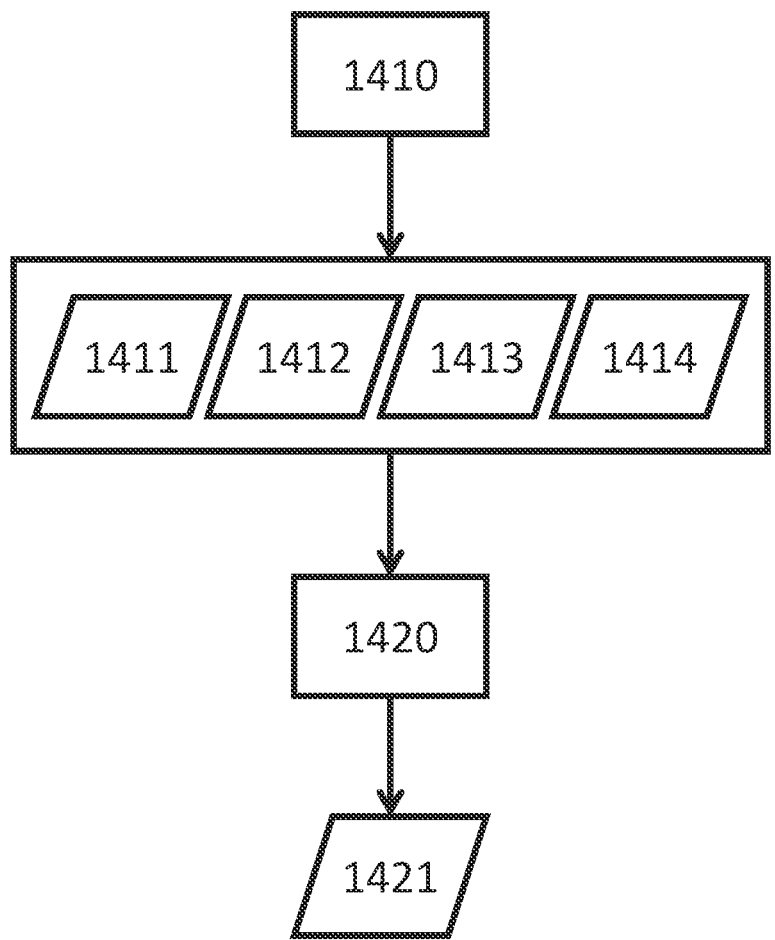
FIG. 14 schematically shows a flowchart of a method, according to an embodiment.

FIG. 14 schematically shows the flowchart of a method, according to another embodiment. In procedure 1410, a first output 1411, a second output 1412, a third output 1413, and a fourth output 1414, of a spatial orientation sensor are obtained when the spatial orientation sensor is respectively at a first orientation, at a second orientation, at a third orientation, and at a fourth orientation. In procedure 1420, a relative orientation 1421 of the spatial orientation sensor with respect to a reference frame is determined based on the first output 1411, the second output 1412, the third output 1413, and the fourth output 1414.

Figure 15:
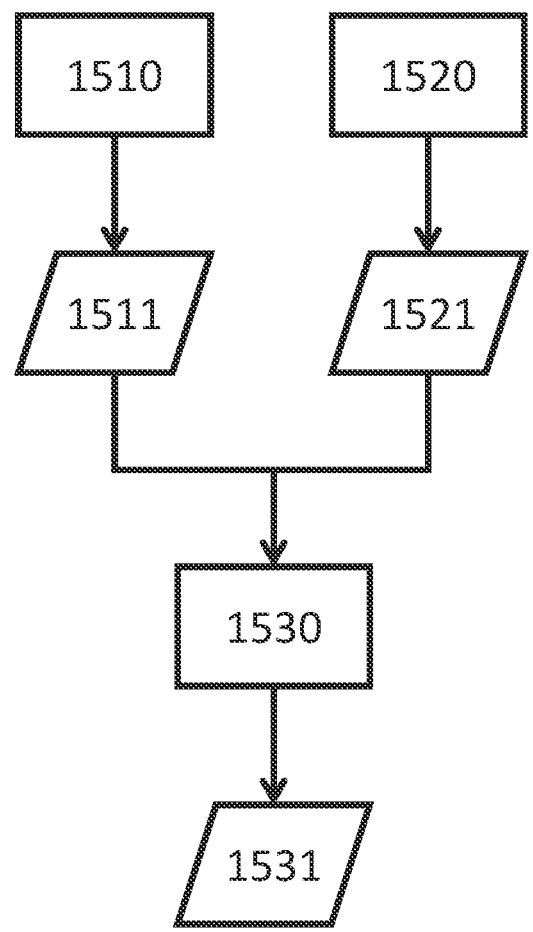
FIG. 15 schematically shows a flowchart of a method, according to an embodiment.

FIG. 15 schematically shows the flowchart of a method, according to another embodiment. In procedure 1510, a first relative orientation 1511 of a person's eye with respect to a first imaging sensor is obtained based on an image obtained using the first imaging sensor. In procedure 1520, a second relative orientation 1521 of a second imaging sensor with respect to the first imaging sensor is obtained. In procedure 1530, a third relative orientation 1531 of the eye with respect to the second imaging sensor is determined based on the first relative orientation 1511 and the second relative orientation 1512.

Methods

C1

Obtaining a first 3D unit vector v_a_1 and a second 3D unit vector v_a_2 in a known coordinate system CS-A; determining a relative orientation of a reference coordinate system CS-R to coordinate system CS-A.

This can be described as:

q_r_a=q_frm_2v(v_a_1, v_a_2, method_index), where the method_index indicates a method for obtaining a unique orientation quaternion q_r_a of CS-R in CS-A from v_a_1, v_a_2. Coordinate system CS-R is uniquely determined by q_r_a.

Two methods of obtaining q_r_a are listed below:

method_index=1:

q_r_a=q_frm_m(m)

where:

m=m_frm_v(v_x, v_y, v_z), see Part A2.3.10 in the Appendix section;

where:

v_x=v_a_1, v_z=v_cru(v_x, v_a_2), v_y=v_cru(v_z, v_x), see Part A2.2.8 in the Appendix section;

where:

m is a 3×3 matrix, v_a_1 is the first unit vector in CS-A, and v_a_2 is the second unit vector in CS-A.

method_index=2:

q_r_a=q_frm_m(m)

where:

m=m_frm_v(v_x, v_y, v_z), see Part A2.3.10 in the Appendix section;

where:

vx=v_cru(v_y, v_z);

where:

vy=v_cru(v_a_2, v_a_1)

vz=v_neg(v_uni(v_add(v_a_1, v_a_2))), see Parts A2.2.10, A2.2.3, A2.2.11 in the Appendix section.

There can be other methods of getting a unique orientation quaternion q_r_a of CS-R in CS-A from two 3D vectors v_a_1 and v_a_2 in CS-A.

C2

Obtaining a vector v_x that is aligned with a rotation axis that a coordinate system CS-X rotates about from a starting quaternions q_x_w_1 relative to CS-W, to an ending quaternions q_x_w_2 relative to CS-W. And obtaining the amount of rotation in degree in the same time.

This can be described as:

v_x=v_frm_2q(q_x_w_1, q_x_w_2), deg=deg_frm_2q(q_x_w_1, q_x_w_2)

where:

q_x_w_1 is the orientation quaternion representing the starting orientation of CS-X in CS-w, and q_x_w_2 is the orientation quaternion representing the ending orientation of CS-X in CS-w.

CS-Y is defined as a coordinate system that is aligned with CS-X at its starting orientation q_x_w_1 in CS-w. Assuming q_x_y_1 is q_x_w_1 transformed from CS-W to CS-Y, then: q_x_y_1=q_ldf(q_x_w_1, q_x_w_1). Assuming q_x_y_2 is q_x_w_2 transformed from CS-W to CS-Y, then: q_x_y_2=q_ldf(q_x_w_1, q_x_w_2). Here q_x_y_1 becomes a unit quaternion and q_x_y_2 represents the orientation change from q_x_y_1 to q_x_y_2 in CS-Y. See Part A2.1.9 in the Appendix section.

Assuming v_x is rotation vector that can be obtained from q_x_y_2, v_x=v_frm_q(q_x_y_2), v_x can be considered as the axis about which the CS-X rotates from q_x_y_1 to q_x_y_2 in CS-Y. See Part A2.2.7 in the Appendix section.

Assuming deg is the amount of rotation about rotation vector v_x in unit of degree, deg=deg_frm_q(q_x_y_2), because CS-Y is aligned with the starting orientation of the CS-X in CS-W, v_x can also be considered as a rotation vector v_x in CS-X about which CS-X rotation from its starting orientation to its ending orientation. See Part A2.2.9 in the Appendix section.

C3

Obtaining a rotation vector aligned with a rotation axis that the spatial orientation sensor rotates about from a starting to an ending orientation and obtaining the amount of rotation in degree in the same time.

A spatial orientation measures the 3D orientation of its coordinate system CS-G in its world coordinate system CS-W. Assuming:

q_g_w_1 is the starting orientation of CS-G in CS-W, and
q_g_w_2 is the ending orientation of CS-G in CS-W,
A rotation vector v_g can be obtained using method described in Part C2 in the Methods section, where:
v_g can also be considered as a rotation vector about which the spatial orientation sensor rotation from its starting orientation to its ending orientation in CS-G. The amount of rotation on degree can be also obtained.

Therefore, v_g and deg_g can be obtained with the method described in Part C2 in the Methods section:
v_g=v_frm_2q(q_g_w_1, q_g_w_2)
deg_g=deg_frm_2q(q_g_w_1, q_g_w_2).

C4

Obtaining the orientation quaternion q_r_g representing the orientation of a reference coordinate system CS-R relative to the spatial orientation sensor coordinate system CS-G from four orientation outputs of the spatial orientation sensor.

This can be described as:
q_r_g=q_frm_4q(q_g_w_1, q_g_w_2, q_g_w_3, q_g_w_4, method_index)
where:
q_g_w_1, q_g_w_2, q_g_w_3 and q_g_w_4 are spatial orientation sensor outputs at 4 orientations relative to CS-W. The four orientations do not have to be all different from each other as long as the following three conditions are met:
  (1) Least 3 of these 4 quaternions are different from each other;
  (2) q_g_w_1 and q_g_w_2 are different;
  (3) q_g_w_3 and q_g_w_4 are different.
q_r_g=q_frm_2v(v_g_1, v_g_2, method_index), where method_index indicates one of many different methods that can be used in Part C1 in the Methods section.
v_g_1=v_frm_2q(q_g_w_1, q_g_w_2) as describe in Part C3 in the Methods section; v_g_2=v_frm_2q(q_g_w_3, q_g_w_4) as describe in Part C3 in the Methods section.

C5

Obtaining quaternion q_ge_gf representing the orientation of spatial orientation sensors GE with coordinate system of CS-GE relative to spatial orientation sensor GF with coordinate system CS-GF from four orientations.

This can be described as:
q_ge_gf=q_frm_8q(q_ge_we_1, q_ge_we_2, q_ge_we_3, q_ge_we_4, q_gf_wf_1, q_gf_wf_2, q_gf_wf_3, q_gf_wf_4, method_index).

Assuming there are two spatial orientation sensors GE and GF, where CS-GE is the coordinate system of spatial orientation sensor GE, and
CS-GF is the coordinate system of spatial orientation sensor GF, and the two spatial orientation sensors are mounted on a frame and their relative orientation does not change during the calibration process, at a given orientation of the frame, the output of the two spatial orientation sensors are:
Quaternion q_ge_we_n representing the orientation of CS-GE in CS-WE, and
Quaternion q_gf_wf_n representing the orientation of CS-GF in CS-WF, where n can be 1, 2, 3, 4.

CS-WE is the world coordinate system that the output of spatial orientation sensor GE references to. CS-WF is the world coordinate system that the output of spatial orientation sensor GF references to.

The outputs quaternions of the two spatial orientation sensors are grouped in pairs: (q_ge_we_n, q_gf_wf_n), where n can be 1, 2, 3, 4. For each q_ge_we_n output from spatial orientation sensor E, there is the q_gf_wf_n output from spatial orientation sensor F at the same time.

Calling q_gf_wf_n as the pairing quaternion of q_ge_we_n, where n can be 1, 2, 3, 4:
q_ge_we_1, q_ge_we_2, q_ge_we_3 and q_ge_we_4 are relative to CS-WE and do not have to be all different from each other as long as the following three conditions are met:
  (1) Least 3 of these 4 quaternions are different from each other;
  (2) q_ge_we_1 and q_ge_we_2 are different; and
  (3) q_ge_we_3 and q_ge_we_4 are different.
q_gf_wf_1, q_gf_wf_2, q_gf_wf_3 and q_gf_wf_4 are relative to CS-WF and do not have to be all different from each other as long as the following three conditions are met:
  (1) Least 3 of these 4 quaternions are different from each other;
  (2) q_gf_wf_1 and q_gf_wf_2 are different; and
  (3) q_gf_wf_3 and q_gf_wf_4 are different.

Using method described in Part C4 in the Methods section:
q_re_ge=q_frm_4q(q_ge_we_1, q_ge_we_2, q_ge_we_3, q_ge_we_4, method_index)
q_rf_gf=q_frm_4q(q_gf_wf_1, q_ge_wf_2, q_gf_wf_3, q_gf_wf_4, method_index)
where:
method_index is one of many different methods that can be used in Part C1 of the Methods section;
q_re_ge is the quaternion representing the orientation of CS-RE in CS-GE; and
q_rf_gf is the quaternion representing the orientation of CS-RF in CS-GF;
and:
CS-RE is a reference coordinate system that can be uniquely determined using q_ge_we_1, q_ge_we_2, q_ge_we_3, q_ge_we_4, and method_index;
CS-RF is a reference coordinate system that can be uniquely determined using q_gf_wf_1, q_gf_wf_2, q_gf_wf_3, q_gf_wf_4, and method_index.

As CS-RE and CS-RF can be considered as the same coordinate system, the relative orientation from CS-GE to CS-GF can be obtained as:
q_ge_gf=q_prd2(q_rf_gf, q_cnj(q_re_ge)).

C6

Figure 2:
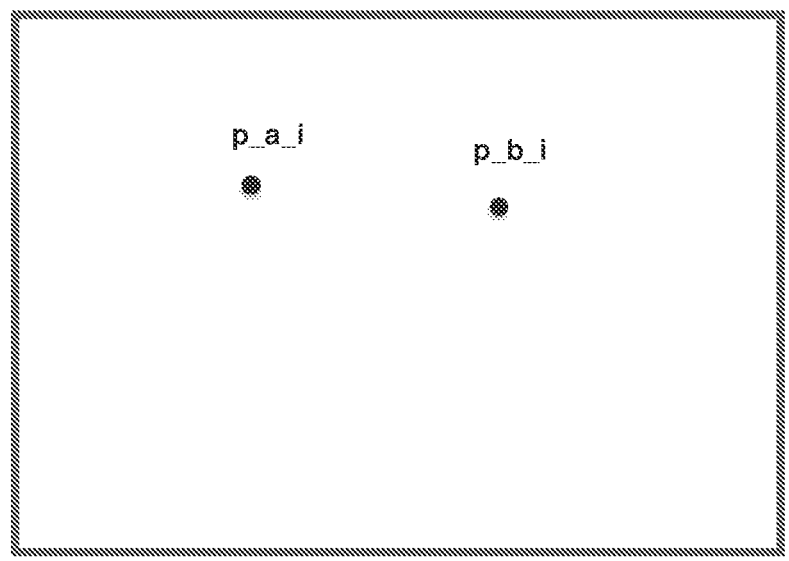
FIG. 2 shows images p_a_i and p_b_i of a pair of points that are fixed in position in the world coordinate system CS-W.

Obtaining an orientation quaternion q_ab_c from images p_a_i and p_b_i as shown in FIG. 2 of a pair of points PA and PB that are fixed in position in the world coordinate system CS-W where the camera coordinate system CS-C is also in. The two fixed points are in the camera's field of view. q_ab_c represents the orientation of a reference coordinate system CS-AB in the camera coordinate system CS-C.

This can be described as:
q_ab_c=q_frm_2p(p_a_i, p_b_i, FOCAL_LEN, method_index).

Assuming there are a pair of fixed physical points PA and PB in world coordinate system CS-W and they are in the field of view of the camera, p_a_i and p_b_i are images of PA and PB in camera image plane as described in Part A1.2 in the Appendix section, FOCAL_LEN is the focal length of the camera in unit of pixel counts, and v_c_a and v_c_b are the unit vectors pointing from origin of CS-C to p_a_i and p_b_i respectively, v_a_c and v_b_c can be obtained based on p_a_i and p_b_i with the method described in Part A1.3 or Part A1.4 in the Appendix section:

v_a_c=v_frm_p(p_a_i, FOCAL_LEN);
v_b_c=v_frm_p(p_b_i, FOCAL_LEN).

Knowing these two 3D vectors v_a_c and v_b_c in CS-C, a reference coordinate system CS-AB can be determined. The orientation quaternion q_ab_c representing the orientation of CS-AB in CS-C can be obtained using method described in Part C1 in the Methods section:

q_ab_c=q_frm_2v(v_a_c, v_b_c, method_index), where:
method_index indicates one of many different methods that can be used in (C1 Methods).

C7

Obtaining a rotation vector in camera coordinate system CS-C using images of a pair of fixed physical points PA and PB at two different orientation of the camera. And obtaining the amount of rotation in degrees in the same time.

This can be described as:
v_c=v_frm_4p(p_a_i_1, p_b_i_1, p_a_i_2, p_b_i_2, FOCAL_LEN, method_index);
deg_c=deg_frm_4p(p_a_i_1, p_b_i_1, p_a_i_2, p_b_i_2, FOCAL_LEN, method_index).

The procedure described in Part C6 can be done twice at two different orientations of the camera using the same pair of physical points PA and PB in world coordinate system CS-W where the CS-C is also in.

Assuming:
p_a_i_1 and p_b_i_1 are the images of physical points PA and PB captured by the camera at the first orientation;
p_a_i_2 and p_a_i_2 are the images of physical points PA and PB captured by the camera at the second orientation; and
FOCAL_LEN is the focal length of the camera in unit of pixel counts,
using method described in Part C6 in the Methods section:
q_ab_c_1=q_frm_2p(p_a_i_1, p_b_i_1, FOCAL_LEN, method_index),
q_ab_c_2=q_frm_2p(p_a_i_2, p_b_i_2, FOCAL_LEN, method_index);
where:
method_index is one of many different methods that can be used in Part C1 in the Methods section;
q_ab_c_1 as the orientation of CS-AB in CS-C when the camera is at the first orientation;
q_ab_c_2 as the orientation of CS-AB in CS-C when the camera is at the second orientation.

CS-AB is a reference coordinate system determined by the images of two physical points PA and PB as described in Part C6 in the Methods section.

Knowing q_ab_c_1 and q_ab_c_2, a rotation vector v_c and the amount of rotation in degree can be obtained using method described in Part C2 in the Methods section:
v_c=v_frm_2q(q_ab_c_1, q_ab_c_2);
deg_c=deg_frm_2q(q_ab_c_1, q_ab_c_2);
where v_c can be considered as a rotation vector about which the camera rotates from its starting orientation to its ending orientation in the coordinate system that is aligned with the starting orientation of CS-C.

C8

Obtaining the orientation of a reference coordinate system CS-RC relative to the camera coordinate system CS-C using images of four fixed physical points PA, PB, PC, PD at 4 orientations of the camera.

This can be described as:
q_rc_c=q_frm_8p(p_a_i_1, p_b_i_1, p_a_i_2, p_b_i_2, p_c_i_1, p_d_i_1, p_c_i_2, p_b_i_d, FOCAL_LEN, method_index).

The procedure described in C7 can be done twice. Each time a physical point is chosen. Therefore:
p_a_i_1 and p_b_i_1 are images of physical points PA and PB captured by the camera at orientation defined as AB1;
p_a_i_2 and p_b_i_2 are images of physical points PA and PB captured by the camera at orientation defined as AB2;
p_c_i_1 and p_d_i_1 are images of physical points PC and PD captured by the camera at orientation defined as CD1;
p_c_i_2 and p_d_i_2 are images of physical points PC and PD captured by the camera at orientation defined as CD2;
FOCAL_LEN is the focal length of the camera in unit of pixel counts.

The four camera orientations AB1, AB2, CD1 and CD2 do not have to be all different from each other as long as the following three conditions are met:

(1) Least 3 of these 4 orientations are different from each other;
(2) Camera orientation number AB1 and AB2 are different; and
(3) Camera orientation number CD1 and CD2 are different.

The first pair of physical points are PA and PB. The second pair of physical points are PC and PD. The second pair of physical points PC and PD can be the same as or different from PA and PB. Therefore, using the method described in Part C7 in the Methods section:
v_ab_c=v_frm_4p(p_a_i_1, p_b_i_1, p_a_i_2, p_b_i_2, FOCAL_LEN, method_index)
v_cd_c=v_frm_4p(p_c_i_1, p_d_i_1, p_c_i_2, p_d_i_2, FOCAL_LEN, method_index)
where:
method_index is one of many different methods that can be used in Part C1 in the Methods section.

The orientation quaternion q_rc_c representation the orientation of a reference coordinate system CS-RC in CS-C can be obtained as:
q_rc_c=q_frm_2v(v_ab_c, v_cd_c, method_index); where method_index indicates one of many different methods that can be used in Part C1 in the Methods section.

C9

Obtaining the orientation quaternion q_c_g representing the orientation of a camera coordinate system CS-C relative to a spatial orientation sensor with coordinate system CS-G using images of 4 fixed physical points at 4 orientations of the camera and spatial orientation sensor.

This can be described as:
q_c_g=q_frm_qc_qg(q_rc_c, q_rg_g, FOCAL_LEN, method_index)

It is assumed that a camera and a spatial orientation sensor are mounted on a rigid frame. Their relative orientation between CS-C and CS-G does not change during the calibration process.

First, the orientation quaternion q_rc_c representing the orientation of a reference coordinate system CS-RC in CS-C can be obtained using the procedure described in (C8 Methods). To be more specific, the procedure requires that the camera to capture a pair of physical points PA and PB in it 3D world coordinate system CS-W where the coordinate system CS-C is also in. The camera needs to capture the images of these pair of fixed physical points PA and PB at 4 of its orientations defined as AB1, AB2, CD1 and CD2.

q_rc_c=q_frm_8p(p_a_i_1, p_b_i_1, p_a_i_2, p_b_i_2, p_c_i_1, p_d_i_1, p_c_i_2, p_b_i_d, FOCAL_LEN, method_index)

where:

p_a_i_1 and p_b_i_1 are images of physical points PA and PB captured by the camera at orientation AB1 p_a_i_2 and p_b_i_2 are images of physical points PA and PB captured by the camera at orientation AB2 p_c_i_1 and p_d_i_1 are images of physical points PC and PD captured by the camera at orientation CD1 p_c_i_2 and p_d_i_2 are images of physical points PC and PD captured by the camera at orientation CD2

FOCAL_LEN is the focal length of the camera in unit of pixel counts.

During this procedure, the spatial orientation sensor outputs are also recoded:

q_g_w_ab1 is the spatial orientation sensor outputs at camera orientation AB1;

q_g_w_ab2 is the spatial orientation sensor outputs at camera orientation AB2;

q_g_w_cd1 is the spatial orientation sensor outputs at camera orientation CD1;

q_g_w_cd2 is the spatial orientation sensor outputs at camera orientation CD2.

The orientation quaternion q_rg_g representing the orientation of a reference coordinate system CS-RG to CS-G can be obtained using method described in Part C4 in the Methods section:

q_rg_g=q_frm_4q(q_g_w_ab1, q_g_w_ab2, q_g_w_cd1, q_g_w_cd2, method_index).

Since CS-RC and CS-RG can be considered as the same coordinate system, the orientation quaternion of CS-C in CS-G can be obtained as:

q_c_g=q_prd2(q_rg_g, q_cnj(q_rc_c)).

C10

Obtaining the orientation quaternion q_ce_cf representing the orientation of coordinate system CS-CE of camera CE to coordinate system CS-CF of camera CF.

This can be described as:

q_ce_cf=q_frm_3q(q_ce_ge, q_cf_gf, q_ge_gf, FOCAL_LEN, method_index)

Assuming:
(1) Camera CE and a spatial orientation sensors GE are mounted on a rigid frame. Their relative orientation does not change during the calibration process.
(2) Camera CF and a spatial orientation sensors GF are mounted on a rigid frame. Their relative orientation does not change during the calibration process.
(3) The relative orientation of spatial orientation sensor GE and spatial orientation sensors GF does not change during the calibration process:

Using method described in Part C9 in the Methods section, the following orientation quaternions can be obtained:

q_ce_ge is the orientation quaternion representing the coordinate system CS-CE of camera CE in the coordinate system CS-GE of spatial orientation sensor GE; and q_cf_gf is the orientation quaternion representing the coordinate system CS-CF of camera CF in the coordinate system CS-GF of spatial orientation sensor GF.

Using method described in Part C5 in the Methods section, the following orientation quaternions can be obtained:

q_ge_gf is the orientation quaternion representing the coordinate system CS-GE of spatial orientation sensor GE in the coordinate system CS-GF of spatial orientation sensor GF.

Therefore, the orientation quaternion q_ce_cf representing the coordinate system CS-CE of camera CE in the coordinate system CS-CF of camera CF can be obtained as:

q_ce_cf=q_prd2(q_cnj(q_cf_gf), q_prd2(q_ge_gf, q_ce_ge)).

C11

Obtaining the focal length FOCAL_LEN of a camera from images of a pair fixed physical points PA and PB in it 3D world coordinate system CS-W where the camera coordinate system CS-C is also in and outputs of spatial orientation sensor from two orientations of the camera.

It is assumed that a camera and a spatial orientation sensor are mounted on a rigid frame. Their relative orientation between camera coordinate system CS-C and spatial orientation sensor's coordinate system CS-G do not change during the calibration process.

The camera needs to capture the images of a pair of fixed physical points PA and PB at two of its orientations defined as AB1, AB2.

Using method described in Part C7 in the Methods section, the amount of rotation deg_c can be obtained:

deg_c=deg_frm_4p(p_a_i_1, p_b_i_1, p_a_i_2, p_b_i_2, FOCAL_LEN, method_index);

p_a_i_1 and p_b_i_1 are images of physical points PA and PB captured by the camera at orientation AB1;

p_a_i_2 and p_b_i_2 are images of physical points PA and PB captured by the camera at orientation AB2;

FOCAL_LEN is the focal length of the camera in unit of pixel counts.

During this procedure, the spatial orientation sensor outputs are also recorded:

q_g_w_ab1 is the spatial orientation sensor outputs at camera orientation AB1;

q_g_w_ab2 is the spatial orientation sensor outputs at camera orientation AB2.

Using method described in (C2 Methods), the amount of rotation deg_g can be obtained:

deg_g=deg_frm_2q(q_g_w_ab1, q_g_w_ab2).

Assuming focal_en_n, where n=1, 2, 3, 4 . . . are known values of the focal length:

deg_c_n=deg_frm_4p(p_a_i_1, p_b_i_1, p_a_i_2, p_b_i_2, focal_len_n, method_index)

where n=1, 2, 3, 4 . . .

the focal_en_n that results the deg_c_n that is closest in value to deg_g can be considered as the best estimated value of camera focal length FOCAL_LEN.

C12

Converting a gaze vector v_ce in camera CE coordinate system CS-CE to the vector v_cf in camera CF coordinate system CS-CF This can be described as:

v_cf=qvq_trans(q_ce_cf, v_ce)

where:

v_cf is the result of transforming vector v_ce from CS-CE to CS-CF.

C13

Converting a vector v_cf in camera CF coordinate system CS-CF to the 2D vector p_cf if the 2D image plane of the camera CF Once v_cf is obtained from method described in (C12 Methods), it can be mapped into a 2D point p_cf in the 2D image place of the camera CF:

p_cf=p_frm_v(v_cf, p_cent, FOCAL_LEN)

where:

p_cent is the center point of the image plane of the camera CF;

FOCAL_LEN is the focal length of the camera CF in unit of pixel.

Appendix

The mathematical tools listed in the Appendix section are used in the Methods section.

A1. Coordinate Systems

Figure 3:
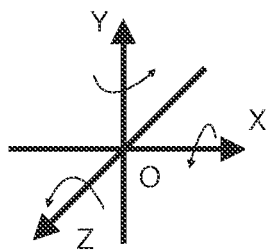
FIG. 3 shows a 3D coordinate system.

A1.1. A 3D coordinate system has 3 axes, X, Y and Z, as shown in FIG. 3. Right hand rule is applied for the order of the axes and the positive rotation directions.

Any two axes can form a plane. Therefore, there are 3 planes defined as P-XY, P-YX and P-ZX planes.

Figure 1:
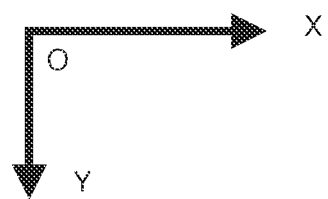
FIG. 1 shows a two-dimensional (2D) coordinate system.

A1.2. A 2D coordinate system for camera image frame has two axes, X, Y, as shown in FIG. 1.

A1.3. Converting a point in 2D camera image frame coordinate system to 3D camera coordinate system.

A 3D camera coordinate system has x axis pointing to the right, y axis pointing to the top and z axis pointing to the opposite direction of the lens.

The 2D image plane can be considered:

Being parallel to the XY plan of the CS-C

With its origin at its top-left corner

With its image center sitting at (0, 0, −1) of CS-C

With its X axis being parallel to the X axis of CS-C, pointing to the same direction With its Y axis being parallel to the Y axis of CS-C, pointing to the opposite direction With different unit from CS-C. To be more specific, FOCAL_LEN is the focal length of the camera in unit of pixel counts.

A unit vector vu pointing from the origin of the CS-C to the point p in the camera image 2D plane can be calculated as:

vu=v_frm_p (p, FOCAL_LEN)

where:

P=(x, y)

vu=(vx, vy, vz)

where:

vu=v_uni(v)

v=(h, v, −1.0)

where:

h=DEFOX(x)=(x−x_center)/FOCAL_LEN v=DEFOY(y)=(y_center−y)/FOCAL_LEN where (x_center, y_center) is the coordinates of the center of the camera image 2D frame.

A1.4. A point in 3D Coordinates can be represented by a 3D vector v=(x, y, z). The vector is from the origin of the coordinate system to the position of the point.

A2. Quaternion, 3D Vector, 3×3 Matrix and 2D vector mathematics

A2.1.1. A quaternion has 4 elements $q=(w, x, y, z)$

A2.1.2. An identity quaternion:

$q=q\_idt(q)=(1, 0, 0, 0)$

A2.1.3. The conjugation of a quaternion:

$q\_cnj(q)=(w, -x, -y, -z)$

A2.1.4. The length of a quaternion:

$q\_len(q)=sqrt(w*w+x*x+y*y+z*z)$ sqrt( ) is square root of a floating point number A2.1.5. A unit quaternion has a length of 1

To unitize a quaternion q:

$u=q\_uni(q)$ where q=(w, x, y, z)

u=(uw, ux, uy, uz)

uw=x/len ux=x/len uy=y/len uz=z/len len=q_len(q)

A2.1.6. The product of 2 quaternions q and p $t=q\_prd2(q, p)=q*p$ where q=(qw, qx, qy, qz)

p=(pw, px, py, pz)

t=(tw, tx, ty, tz)

and $tw=(qw*pw-qx*px-qy*py-qz*pz)$ $tx=(qw*px+qx*pw+qy*pz-qz*py)$ $ty=(qw*py-qx*pz+qy*pw+qz*px)$ $tz=(qw*pz+qx*py-qy*px+qz*pw)$ As a quaternion can be used to represent a rotation transformation, if q2 is product of 2 quaternion q2=q_prd2 (q1, q0), then applying q2 as a orientation transformation is equivalent to applying q0 and then q1.

A2.1.7 The product of 3 quaternions $q=q\_prd3(q1, q2, q3)=q\_prd2(q1, q\_prd2(q2, q3))$ A2.1.8 The product of 4 quaternions $q=q\_prd4(q1, q2, q3, q4)=q\_prd2(q1, q\_prd3(q2, q3, q4))$ A2.1.9 The left difference of 2 quaternions $q=q\_ldf(q1, q2)=q\_prd2(q\_cnj(q1), q2)$ A2.2.1 A 3D vector has 3 elements v=(x, y, z)

A2.2.2 The length of a 3D vector:

$v\_len(v)=sqrt(x*x+y*y+z*z)$

A2.2.3 A unit 3D vector has a length of 1

To unitize a 3D vectors v:

$u=v\_uni(v)$ where v=(x, y, z)

u=(ux, uy, uz)

$ux = x/\text{len}$ $uy = y/\text{len}$ $uz = z/\text{len}$ $\text{len} = v\_\text{len}(v)$ A2.2.4 A unit quaternion can be interpreted as a combination of rotation vector and an angle rotating about this vector:

$q = (w, x, y, z)$ $v = (vx, vy, vz)$ is the rotation vector
theta is the rotation angle
where $w = \cos(\text{theta}/2)$ $x = vx * \sin(\text{theta}/2)$ $y = vy * \sin(\text{theta}/2)$ $z = vz * \sin(\text{theta}/2)$ A2.2.5 Dot product of 2 3D vectors va, vb:

$d = v\_\text{dot}(va, vb) = va.vb = ax*bx + ay*by + az*bz$ where $va = (ax, ay, az)$ $vb = (bx, by, bz)$ Assuming theta to be angle between va and vb:
Then: $\cos(\text{theta}) = v\_\text{dot}(va, vb)$ A2.2.6 Cross product of 2 3D vectors va, vb:

$vc = v\_\text{crs}(va, vb) = va \times vb$ where $va = (ax, ay, az)$ $vb = (bx, by, bz)$ $vc = (cx, cy, cz)$ $cx = ay*bz - az*by$ $cy = az*bx - ax*bz$ $cz = ax*by - ay*bx$ A2.2.7. Rotation vector v from unit quaternion q:

$v = v\_\text{frm}\_q(q) = (x, y, z)$ where $q = (qw, qx, qy, qz)$ $\text{len} = v\_\text{len}(qx, qy, qz)$ $x = qx/\text{len}$ $y = qy/\text{len}$ $z = qz/\text{len}$.

A2.2.8. Unitized vector of the cross product of two 3D vectors va, vb:

$v = v\_\text{cru}(q) = v\_\text{uni}(v\_\text{crs}(va, vb))$.

A2.2.9. Rotation degrees from unit quaternion q:

$\text{deg} = \text{deg}\_\text{frm}\_q(q)$ where $q = (qw, qx, qy, qz)$ $\text{deg} = 2 * \text{acos}(qw)$ acos( ) is arccosine, the output is in unit of degree.

A2.2.10. Adding two 3D vectors va, vb:

$v = v\_\text{add}(va, vb) = (x, y, z)$ $va = (ax, ay, az)$ $vb = (bx, by, bz)$ $x = ax + bx$ $y = ay + by$ $z = az + bz$.

A2.2.11. Negative vector of a 3D vectors va:

$v = v\_\text{neg}(va) = (x, y, z)$ $va = (ax, ay, az)$ $x = -ax$ $y = -ay$ $z = -az$.

A2.3.1. 3×3 matrix $$m = \begin{pmatrix} Xx & Yx & Zx \\ Xy & Yy & Zy \\ Xz & Yz & Zz \end{pmatrix}$$

A2.3.2. identity 3×3 matrix $$m = m\_\text{idt}() == \begin{pmatrix} 1 & 0 & 0 \\ 0 & 1 & 0 \\ 0 & 0 & 1 \end{pmatrix}$$

A2.3.3. matrix subtraction $$m2 = m\_\text{sub}(m1, m0) = m1 - m0 = \begin{pmatrix} Xx1-Xx0 & Yx1-Yx0 & Zx1-Zx0 \\ Xy1-Xy0 & Yy1-Yy0 & Zy1-Zy0 \\ Xz1-Xz0 & Yz1-Yz0 & Zz1-Zz0 \end{pmatrix}$$

$$m1 = \begin{pmatrix} Xx1 & Yx1 & Zx1 \\ Xy1 & Yy1 & Zy1 \\ Xz1 & Yz1 & Zz1 \end{pmatrix}$$

$$m0 = \begin{pmatrix} Xx0 & Yx0 & Zx0 \\ Xy0 & Yy0 & Zy0 \\ Xz0 & Yz0 & Zz0 \end{pmatrix}$$

A2.3.4. matrix vector multiplication $$vd = \text{mv\_prd}(m, v) = m * vs$$

$$m = \begin{pmatrix} Xx & Yx & Zx \\ Xy & Yy & Zy \\ Xz & Yz & Zz \end{pmatrix}$$

$$vs = (x, y, z)$$

$$vd = (dx, dy, dz)$$

where:

$$dx = Xx*x + Yx*y + Zx*z$$

$$dy = Xy*x + Yy*y + Zy*z$$

$$dz = Xz*x + Yz*y + Zz*z$$

A2.3.5. matrix from quaternion $$m = \text{m\_frm\_q}(q)$$

$$q = (qw, qx, qy, qz)$$

where m is a 3×3 matrix $$m = \begin{pmatrix} Xx & Yx & Zx \\ Xy & Yy & Zy \\ Xz & Yz & Zz \end{pmatrix} \text{ and}$$

$$Xx = 1.0f - 2.0f*qy*qy - 2.0f*qz*qz$$

$$Xy = 2.0f*qx*qy + 2.0f*qw*qz$$

$$Xz = 2.0f*qx*qz - 2.0f*qw*qy$$

$$Yx = 2.0f*qx*qy - 2.0f*qw*qz$$

$$Yy = 1.0f - 2.0f*qx*qx - 2.0f*qz*qz$$

$$Yz = 2.0f*qy*qz + 2.0f*qw*qx$$

$$Zx = 2.0f*qx*qz + 2.0f*qw*qy$$

$$Zy = 2.0f*qy*qz - 2.0f*qw*qx$$

$$Zz = 1.0f - 2.0f*qx*qx - 2.0f*qy*qy$$

A2.3.6. Transform a 3D vectors v with a quaternion q:

$$vd = qvq\_\text{trans}(q, vs) = \text{mv\_prd}(m, vs)$$

where
q is a quaternion
vs is the source 3D vector
vd is the result 3D vector
m is a 3×3 matrix $$m = \text{m\_frm\_q}(q)$$

A2.3.7. Matrix by rotating x axis $$m = \text{m\_frm\_x\_axis\_sc}(s, c) \text{ where}$$

$$m = \begin{pmatrix} Xx & Yx & Zx \\ Xy & Yy & Zy \\ Xz & Yz & Zz \end{pmatrix}$$

$$s = \sin(\text{theta})$$

$$c = \cos(\text{theta}) \text{ and}$$

$$Xx = 1.0$$

$$Yx = 0.0$$

$$Zx = 0.0$$

$$Xy = 0.0$$

$$Yy = c$$

$$Zy = -s$$

$$Xz = 0.0$$

$$Yz = s$$

$$Zz = c$$

A2.3.8. Matrix by rotating y axis $$m = \text{m\_frm\_y\_axis\_sc}(s, c) \text{ where}$$

$$m = \begin{pmatrix} Xx & Yx & Zx \\ Xy & Yy & Zy \\ Xz & Yz & Zz \end{pmatrix}$$

$$s = \sin(\text{theta})$$

$$c = \cos(\text{theta}) \text{ and}$$

$$Xx = c$$

$$Yx = 0.0$$

$$Zx = s$$

$$Xy = 0.0$$

$$Yy = 1.0$$

$$Zy = 0.0$$

$$Xz = -s$$

$$Yz = 0.0$$

$$Zz = c$$

A2.3.9. Quaternion from matrix $$q = \text{q\_frm\_m}(m) \text{ where}$$

$$q = (w, x, y, z)$$

$$m = \begin{pmatrix} Xx & Yx & Zx \\ Xy & Yy & Zy \\ Xz & Yz & Zz \end{pmatrix}$$

and:

```
if( Zz < 0 ) {
   if (Xx > Yy) {
      t = 1 + Xx - Yy - Zz
      w = Yz - Zy
      x = t
      y = Xy + Yx
      z = Zx + Xz
   } else {
      t = 1 - Xx + Yy - Zz
      w = Zx - Xz
      x = Xy + Yx
      y = t
      z = Yz + Zy
```

-continued

```
        }
    } else {
        if( Xx < -Yy ) {
            t = 1 - Xx - Yy + Zz
            w = Xy - Yx
            x = Zx + Xz
            y = Yz + Zy
            z = t
        } else {
            t = 1 + Xx + Yy + Zz
            w = t
            x = Yz - Zy
            y = Zx - Xz
            z = Xy - Yx
        }
    }
```

A2.3.10. matrix from vector $m = \text{m\_frm\_v}(vx, vy, vz)$ where $$m = \begin{pmatrix} Xx & Yx & Zx \\ Xy & Yy & Zy \\ Xz & Yz & Zz \end{pmatrix}$$

$vx = (Xx, Xy, Xz)$ $vy = (Yx, Yy, Yz)$ $vz = (Zx, Zy, Zz)$

A2.4.1. A point in 2D space is also a 2D vector, it has 2 elements $p = (x, y)$

A2.4.2. The distance d between 2 2D points pa, pb is:

$d = p\_dist(pa, pb) = \text{sqrt}((xa-xb)*(xa-xb)+(ya-yb)*(ya-yb))$ where $pa = (xa, ya)$ $pb = (xb, yb)$ A2.4.3. The length of a 2D vector:

$p\_len(p) = \text{sqrt}(x*x + y*y)$

A2.4.4. A unit 2D vector has a length of 1
To unitize a 2D vectors p:

$u = p\_uni(p)$ where $p = (x, y)$ $u = (ux, uy)$ $ux = x/\text{len}$ $uy = y/\text{len}$ $\text{len} = p\_len(v)$ A2.4.5. Dot product of two 2D vectors pa, pb:

$d = p\_dot(pa, pb) = xa*xb + ya*yb$ where $pa = (xa, ya)$ $pb = (xb, yb)$

There is an important property of vector dot product,
Assuming theta to be angle between pa and pb:
Then: $\cos(theta) = p\_dot(pa, pb)$ A2.4.6. 2D point from 3D vector:

$p = p\_frm\_v(v\_in, p\_cent, foc\_len)$ where $p = (xp, yp)$ is the 2D point
$v = (xv, yv, zv)$ is a 3D vector in camera coordinate system CS-C
$p\_cent = (xc, yc)$ is the center point of the image plane
$foc\_len$ is the focal length of the camera in unit of pixel
and we can have:

$xp = xv * \text{scale} + xc;$ $yp = -yv * \text{scale} + yc;$ where: $\text{scale} = foc\_len / zv$.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   determining a first relative rotation of an imaging sensor between a first orientation of the imaging sensor and a second orientation of the imaging sensor;
   determining a second relative rotation of the imaging sensor between a third orientation of the imaging sensor and a fourth orientation of the imaging sensor;
   determining a relative orientation of the imaging sensor with respect to a reference frame based on the first relative rotation and the second relative rotation;
   wherein determining the first relative rotation comprises:
      obtaining a first image of a first point in a three-dimensional space and a second image of a second point in the three-dimensional space, using the imaging sensor at the first orientation;
      obtaining a third image of the first point and a fourth image of the second point, using the imaging sensor at the second orientation;
      determining the first relative rotation based on the first image, the second image, the third image and the fourth image.

2. The method of claim 1, wherein at least three of the first orientation, the second orientation, the third orientation and the fourth orientation are different from one another; wherein the first orientation and the second orientation are different; wherein the third orientation and the fourth orientation are different.

3. A method comprising:
   obtaining a first image of a first point in a three-dimensional space and a second image of a second point in the three-dimensional space, using an imaging sensor at a first orientation;
   obtaining a third image of the first point and a fourth image of the second point, using the imaging sensor at a second orientation;
   obtaining a first output and a second output of a spatial orientation sensor when the imaging sensor is respectively at the first orientation and at the second orientation;
   determining a focal length of the imaging sensor based on the first image, the second image, the third image, the fourth image, the first output and the second output;

wherein the imaging sensor and the spatial orientation sensor have fixed orientation with respect to each other;

wherein the first output and the second output of the spatial orientation sensor respectively represent the first orientation and the second orientation relative to a reference frame.

4. The method of claim 3, wherein determining the focal length comprises determining a relative rotation of the imaging sensor between the first orientation and the second orientation, based on the first image, the second image, the third image and the fourth image.

5. A method comprising:
obtaining a first output of a spatial orientation sensor when the spatial orientation sensor is at a first orientation;
rotating the spatial orientation sensor from the first orientation to a second orientation;
obtaining a second output of the spatial orientation sensor when the spatial orientation sensor is at the second orientation;
obtaining a third output of the spatial orientation sensor when the spatial orientation sensor is at a third orientation;
rotating the spatial orientation sensor from the third orientation to a fourth orientation;
obtaining a fourth output of the spatial orientation sensor when the spatial orientation sensor is at the fourth orientation;
determining a first rotation of the spatial orientation sensor from the first orientation to the second orientation based on the first output and the second output;
determining a second rotation of the spatial orientation sensor from the third orientation to the fourth orientation based on the third output and the fourth output;
determining a relative orientation of the spatial orientation sensor with respect to a reference frame based on the first rotation and the second rotation;
wherein at least three of the first orientation, the second orientation, the third orientation, and the fourth orientation are different from one another; wherein the first orientation and the second orientation are different; wherein the third orientation and the fourth orientation are different.

6. A machine-readable non-transitory medium having instructions recorded thereon, the instructions when executed by a computer implementing the method of claim 1.

7. An apparatus comprising:
a first imaging sensor;
a second imaging sensor;
a first spatial orientation sensor;
a second spatial orientation sensor;
wherein the first spatial orientation sensor, the second spatial orientation sensor, the first imaging sensor and the second imaging sensor have fixed relative orientations with respect to one another; and
a computing device comprising a processor and the machine-readable non-transitory medium of claim 6.

8. A machine-readable non-transitory medium having instructions recorded thereon, the instructions when executed by a computer implementing the method of claim 3.

9. An apparatus comprising:
a first imaging sensor;
a second imaging sensor;
a first spatial orientation sensor;
a second spatial orientation sensor;
wherein the first spatial orientation sensor, the second spatial orientation sensor, the first imaging sensor and the second imaging sensor have fixed relative orientations with respect to one another; and
a computing device comprising a processor and the machine-readable non-transitory medium of claim 8.

10. A machine-readable non-transitory medium having instructions recorded thereon, the instructions when executed by a computer implementing the method of claim 5.

11. An apparatus comprising:
a first imaging sensor;
a second imaging sensor;
a first spatial orientation sensor;
a second spatial orientation sensor;
wherein the first spatial orientation sensor, the second spatial orientation sensor, the first imaging sensor and the second imaging sensor have fixed relative orientations with respect to one another; and
a computing device comprising a processor and the machine-readable non-transitory medium of claim 10.

* * * * *